United States Patent
Melkote Krishnaprasad et al.

(10) Patent No.: US 10,397,481 B2
(45) Date of Patent: Aug. 27, 2019

(54) STABILIZATION AND ROLLING SHUTTER CORRECTION FOR OMNIDIRECTIONAL IMAGE CONTENT

(71) Applicant: QUALCOMM Incorporated, San Diego, CA (US)

(72) Inventors: Vinay Melkote Krishnaprasad, Bangalore (IN); Pushkar Gorur Sheshagiri, Bengaluru (IN); Pawan Kumar Baheti, Bangalore (IN); Ajit Deepak Gupte, Bangalore (IN); Ajit Venkat Rao, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 109 days.

(21) Appl. No.: 15/649,229

(22) Filed: Jul. 13, 2017

(65) Prior Publication Data
US 2019/0020802 A1    Jan. 17, 2019

(51) Int. Cl.
*H04N 5/232* (2006.01)
*G06T 3/40* (2006.01)
*H04N 5/247* (2006.01)
*G06T 5/50* (2006.01)

(52) U.S. Cl.
CPC ......... *H04N 5/2327* (2013.01); *G06T 3/4038* (2013.01); *G06T 5/50* (2013.01); *H04N 5/247* (2013.01); *G06T 2207/20221* (2013.01)

(58) Field of Classification Search
CPC .... H04N 5/2327; H04N 5/247; G06T 3/4038; G06T 5/50
See application file for complete search history.

(56) References Cited

U.S. PATENT DOCUMENTS

| | | | |
|---|---|---|---|
| 5,650,814 A * | 7/1997 | Florent | G06T 5/008 348/36 |
| 6,761,117 B1 * | 7/2004 | Benz | F42B 12/365 102/482 |
| 9,077,961 B1 | 7/2015 | Saltzman | |
| 9,148,571 B2 | 9/2015 | Tripathi | |
| 9,325,917 B2 | 4/2016 | MacMillan et al. | |
| 9,413,962 B2 | 8/2016 | Tsubaki et al. | |
| 9,460,495 B2 | 10/2016 | Wu et al. | |

(Continued)

OTHER PUBLICATIONS

International Search Report and Written Opinion—PCT/US2018/038037—ISA/EPO—dated Sep. 11, 2018 (13 pp).

(Continued)

*Primary Examiner* — Hunter B Lonsberry
(74) *Attorney, Agent, or Firm* — Shumaker & Sieffert, P.A.

(57) ABSTRACT

Techniques are described for addressing rolling shutter delay and in some cases rolling shutter delay and stabilization. Processing circuits may receive image content in overlapping portions of images, and may adjust the image content until there is overlap in the overlapping portions. Processing circuits may also receive information of deviation of the device from a common reference. Based on the overlapping image content, the deviation of the device from the common reference, and image content in non-overlapping portions, the processing circuits may determine mapping of coordinates to a rectangular mesh for generating an equirectangular image.

28 Claims, 14 Drawing Sheets

(56) References Cited

U.S. PATENT DOCUMENTS

2015/0271483 A1* 9/2015 Sun .................. H04N 17/002
 348/187
2017/0124680 A1* 5/2017 Holzer ............... H04N 13/282

OTHER PUBLICATIONS

Hanning, et al., "Stabilizing Cell Phone Video using Inertial Measurement Sensors," IEEE IVVC Workshops, Nov. 6-13, 2011, 8 pp.

Karpenko, et al., "Digital Video Stabilization and Rolling Shutter Correction using Gyroscopes," Stanford Tech Report CTSR 2011-03, Oct. 2011, 7 pp.

Forssen, et al., "Rectifying rolling shutter video from hand-held devices," IEEE Computer Society Conference on Computer Vision and Pattern Recognition, Jul. 2010, 8 pp.

Hong et al., "Video Stabilization and Rolling Shutter Distortion Reduction," Proceedings of 2010 IEEE 17th International Conference on Image Processing, pp. 3501-3504, Sep. 26-29, 2010, Hong Kong.

Jia et al., "Probabilistic 3-D motion Estimation for Rolling Shutter Video Rectification from Visual and Inertial Measurements," IEEE Multimedia and Signal Processing Workshop Sep. 2012, pp. 203-208.

Cho, et al., "CMOS digital image stabilization," IEEE Trans. Consumer Electronics, Aug. 2007, vol. 53, No. 3 pp. 979-986.

Cho et al., "Affine Motion Based CMOS Distortion Analysis and CMOS Digital Image Stabilization," IEEE Trans. Consumer Electronics, Aug. 2007, vol. 53, No. 3 pp. 833-841.

"Giroptic 360cam," Giroptic, accessed on Jan. 4, 2017 from http://www.360.tv/en/, 4 pp.

"KeyMission 360 Camera: 360 Degree Videos & Photos," Nikon USA, accessed on Jan. 4, 2017 from https://www.nikonusa.com/en/nikon-products/product/action-camera/keymission-360.html?icid=action_cat:button_learn:1:action:360:091916:top_pdp, 7 pp.

* cited by examiner

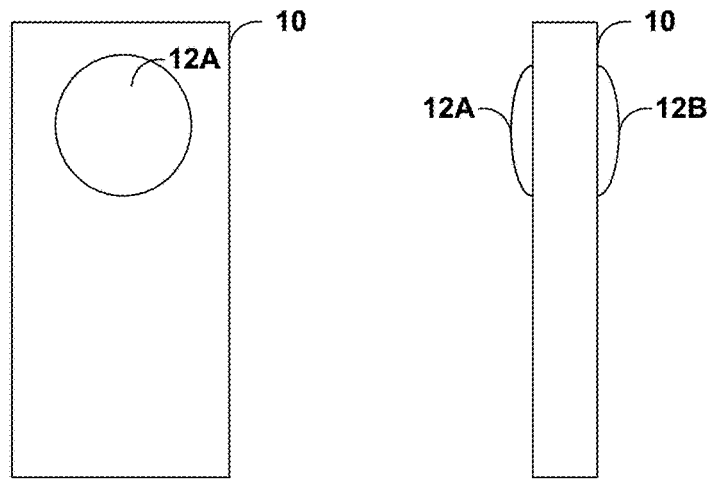
FIG. 1
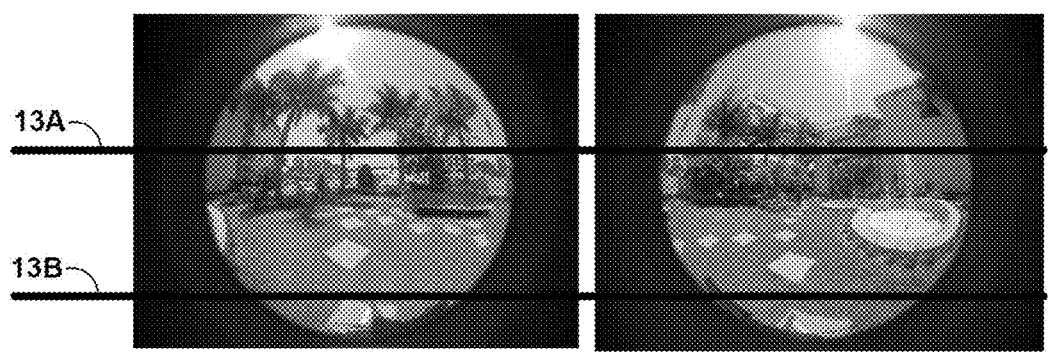
FIG. 2A  FIG. 2B

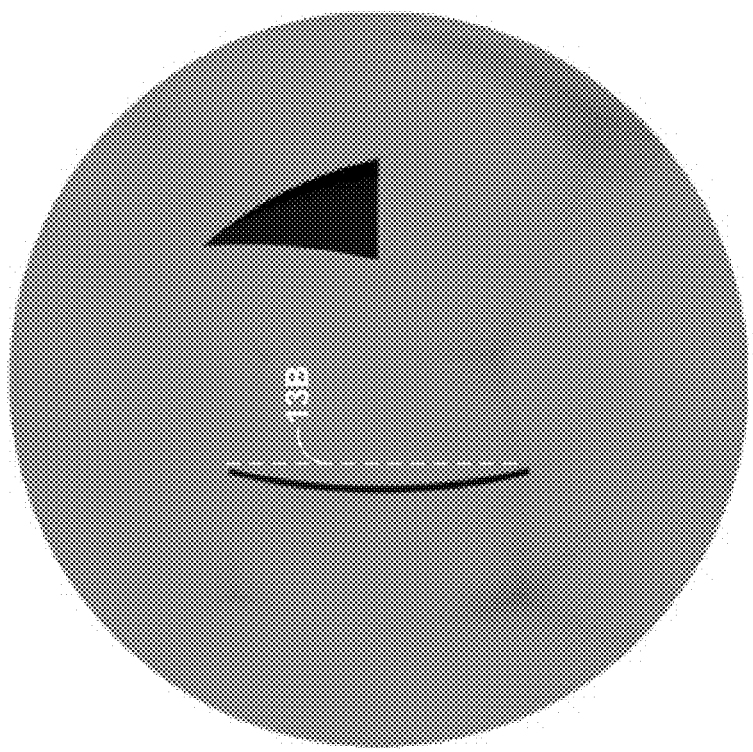
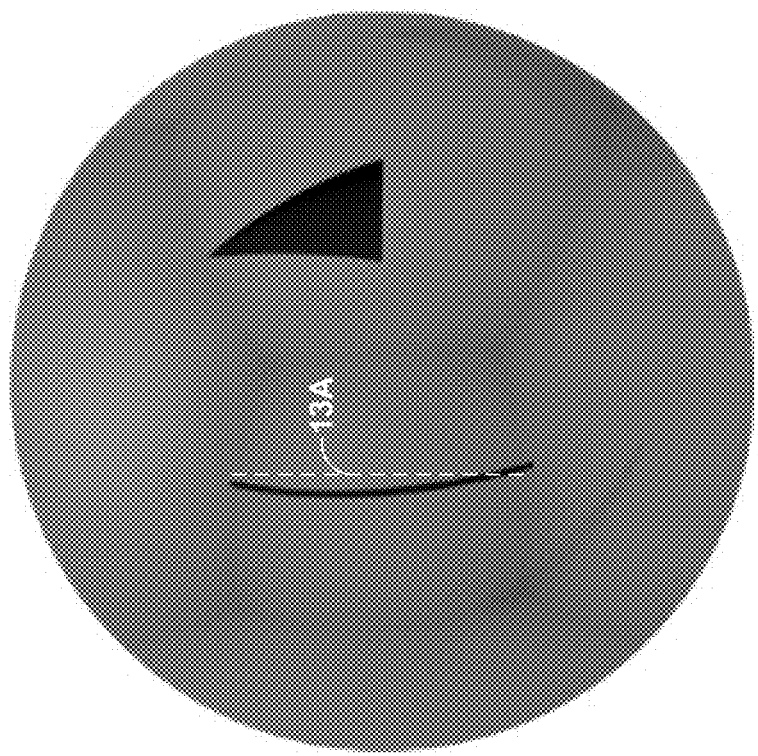

STABILIZATION AND ROLLING SHUTTER CORRECTION FOR OMNIDIRECTIONAL IMAGE CONTENT

TECHNICAL FIELD

The disclosure relates to stabilization and rolling shutter correction.

BACKGROUND

Some camera devices include a plurality of lenses used to capture 360-degree image content. Examples of these lenses include fisheye lenses. The captured image content is processed as a series of images that are stitched together and rendered to generate a 360-degree image. The 360-degree images may be mapped onto a spherical structure to generate the 360-degree image content that the viewer views.

SUMMARY

In general, this disclosure describes techniques for stabilization and rolling shutter correction for omnidirectional video. A camera device may not be stable due to user movement resulting in wobble in the video content when the captured images are presented sequentially. Stabilization correction may address one cause of wobble. Another cause of wobble may be rolling shutter delay, where each line (e.g., row or column) of sensors of a camera captures image content at slightly different times. When the captured images are presented sequentially, the difference in the times when each line captured the image content may cause the video content to appear wobbly.

For omnidirectional image content (e.g., used for generating omnidirectional video), different cameras capture image content that together forms the 360-degree image content. There may be overlapping image content in image content captured by two different cameras. The example techniques described in this disclosure utilize the overlapping image content and the different capture times of the different lines of sensors to adjust location of where the image content is displayed to mitigate the potential wobble. For instance, the example techniques to adjust the location where the image content is displayed may compensate for at least one of device movement or rolling shutter delay during capturing of the image content. Additionally, in some examples, adjusting the location of where the image content is displayed may potentially cause some "holes" in the image content, and example techniques described in disclosure address the holes (e.g., by ensuring that holes are not created).

In one example, the disclosure describes a method of generating image content, the method comprising receiving image content for a first set of bands of a first overlapping portion of a first image, and a second set of bands of a second overlapping portion of a second image, wherein the first overlapping portion and the second overlapping portion include overlapping image content, and wherein the first image includes a first non-overlapping portion, adjusting image content in the first set of bands until the image content in the first set of bands overlaps with image content in the second set of bands to generate a set of overlapping bands, receiving information indicative of deviation from a common reference, determining coordinates for where image content in the set of overlapping bands and the first non-overlapping portion is to be mapped on a rectangular mesh based on the deviation from the common reference to compensate for at least one of device movement or rolling shutter delay during capturing of the image content, and generating an equirectangular image based at least in part on the determined coordinates, the set of overlapping bands, and the first non-overlapping portion.

In one example, the disclosure describes a device for generating image content, the device comprising a memory configured to store a first image and a second image, and one or more processing circuits configured to receive image content for a first set of bands of a first overlapping portion of the first image, and a second set of bands of a second overlapping portion of the second image, wherein the first overlapping portion and the second overlapping portion include overlapping image content, and wherein the first image includes a first non-overlapping portion, adjust image content in the first set of bands until the image content in the first set of bands overlaps with image content in the second set of bands to generate a set of overlapping bands, receive information indicative of deviation from a common reference, determine coordinates for where image content in the set of overlapping bands and the first non-overlapping portion is to be mapped on a rectangular mesh based on the deviation from the common reference to compensate for at least one of device movement or rolling shutter delay during capture of the image content, and generate an equirectangular image based at least in part on the determined coordinates, the set of overlapping bands, and the first non-overlapping portion.

In one example, the disclosure describes a computer-readable storage medium storing instructions that when executed cause one or more processors of a device for generating image content to receive image content for a first set of bands of a first overlapping portion of a first image, and a second set of bands of a second overlapping portion of a second image, wherein the first overlapping portion and the second overlapping portion include overlapping image content, and wherein the first image includes a first non-overlapping portion, adjust image content in the first set of bands until the image content in the first set of bands overlaps with image content in the second set of bands to generate a set of overlapping bands, receive information indicative of deviation from a common reference, determine coordinates for where image content in the set of overlapping bands and the first non-overlapping portion is to be mapped on a rectangular mesh based on the deviation from the common reference to compensate for at least one of device movement or rolling shutter delay during capture of the image content, and generate an equirectangular image based at least in part on the determined coordinates, the set of overlapping bands, and the first non-overlapping portion.

In one example, the disclosure describes a device for generating image content, the device comprising means for receiving image content for a first set of bands of a first overlapping portion of a first image, and a second set of bands of a second overlapping portion of a second image, wherein the first overlapping portion and the second overlapping portion include overlapping image content, and wherein the first image includes a first non-overlapping portion, means for adjusting image content in the first set of bands until the image content in the first set of bands overlaps with image content in the second set of bands to generate a set of overlapping bands, means for receiving information indicative of deviation from a common reference, means for determining coordinates for where image content in the set of overlapping bands and the first non-overlapping portion is to be mapped on a rectangular mesh based on the deviation from the common reference to compensate for at least one of device movement or rolling shutter delay during capture of the image content, and means for generating an equirectangular image based at least in part on the determined coordinates, the set of overlapping bands, and the first non-overlapping portion.

The details of one or more examples are set forth in the accompanying drawings and the description below. Other features, objects, and advantages will be apparent from the description, drawings, and claims.

BRIEF DESCRIPTION OF DRAWINGS

FIG. 1 is a block diagram illustrating an example device for capturing 360-degree image content in accordance with one or more example techniques described in this disclosure.

FIGS. 2A and 2B are pictorial diagrams illustrating images captured from the device of FIG. 1.

FIGS. 4A and 4B are conceptual diagrams illustrating differences between global and rolling shutter.

DETAILED DESCRIPTION

Figure 3A:
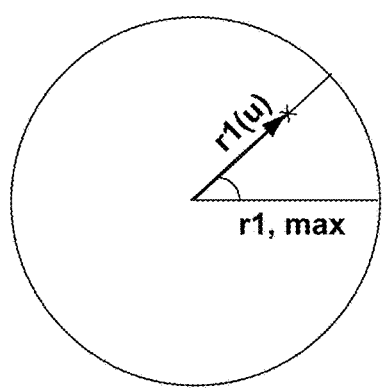
FIGS. 3A and 3B are conceptual diagrams illustrating mapping of a point on a circular image to a band in a sphere.

The example techniques described in this disclosure are related to generating a 360-degree video or image. In a 360-degree video or image, the video/image content forms a conceptual sphere around the viewer. The viewer can view image content from multiple perspectives (e.g., in front, behind, above, and all around), and such image content is called a 360-degree image.

In this disclosure, an image that includes 360-degrees of image content or viewable content means that the image includes content for all perspectives (e.g., content above, below, behind, in front, and on each sides). For instance, conventional images capture slightly less than 180-degree of image content, and do not capture content on the sides of the camera.

In general, a 360-degree video is formed from a sequence of 360-degree images. Accordingly, the example techniques described in this disclosure are described with respect to generating 360-degree image content. Then, for 360-degree video content, these 360-degree images can be displayed sequentially. In some examples, a user may desire to take only a 360-degree image (e.g., as a snapshot of the entire 360-degree surrounding of the user), and the techniques described in this disclosure are applicable to such example cases as well.

The techniques may be applicable to captured video content, virtual reality, and generally to video and image displaying. The techniques may be used in mobile devices, but the techniques should not be considered limited to mobile applications. In general, the techniques may be for virtual reality applications, video game applications, or other applications where a 360-degree spherical video/image environment is desired.

The 360-degree image content may be captured with a camera device that includes two fisheye lenses (e.g., positioned to capture opposite portions of the sphere of image content). The two fisheye lenses capture respective portions of the full sphere of the 360-degree video. However, the images generated by the captured portions are circular images (e.g., one image frame includes two circular images).

As described above, a camera device includes a plurality of fisheye lenses. Some example camera devices include two fisheye lenses, but the example techniques are not limited to two fisheye lenses. One example camera device may include 16 lenses (e.g., 16-camera array for filming 3D VR content). Another example camera device may include eight lenses, each with 195-degree angle of view (e.g., each lens captures 195 degrees of the 360 degrees of image content). Other example camera devices include three or four lenses. Some examples may include a 360-degree lens that captures 360-degrees of image content.

The example techniques described in this disclosure are generally described with respect to two fisheye lenses capturing a 360-degree image/video. However, the example techniques are not so limited. The example techniques may also be applicable to example camera devices that include a plurality of lenses (e.g., two or more) even if the lenses are not fisheye lenses. For instance, the example techniques describe ways to modify captured images to compensate shifting caused by imprecise stabilization and rolling shutter delay during the capturing of the image content, and the techniques may be applicable to examples where there are a plurality of captured images from a plurality of lenses (which may be fisheye lenses, as an example). The example techniques may also be applicable to various camera types used for capturing 360-degree images/videos.

For smooth video, static content from one image to the next should preferably appear to be in the same location and not moving. However, at times the video may appear wobbly or vibrating, where static content from one image to the next moves. Another example of video appearing wobbly is when image content that is expected to move in a particular manner from one image to the next appears to move differently than expected.

There are two potential causes of vibrations or wobble in 360-degree video content. A first cause is lack of stabilization, and a second cause is rolling shutter. In use, the camera device may not be stable causing vibrations or wobble in the video. Global stabilization techniques exist to correct stabilization.

Rolling shutter (or rolling shutter delay) refers to the behavior of camera devices where lines (e.g., rows or columns) of sensors of a camera capture image content at slightly different times. For example, a first row of sensors for a first fisheye lens and a first row of sensors for a second fisheye lens may capture image content at time T0, a second row of sensors for the first fisheye lens and a second row of sensors for the second fisheye lens may capture image content at time T0+k, and so forth.

In this disclosure, a row of sensors is used to described the hardware component that generates a current in response to receiving light (e.g., the sensors capture the image content). The current generated from the received light is the used to determine the color for pixels for an image of the image content.

Because image content is captured at slightly different times per row, the video content may appear to wobble or vibrate. Even if the image is corrected for a global deviation from a specific position, the uncorrected rolling shutter may manifest as wobble in the case of 360-degree video content. This disclosure describes example techniques to reduce the effects of rolling shutter in the context of 360-degree video content, as well as some additional optional techniques to address potential "holes" that may be generated in the video content.

The image captured by fisheye lenses are circular, and each fisheye lens captures a little more than half-a-sphere (e.g., a little more than 180-degrees of image content). Accordingly, there is overlapping image content in each circular image (e.g., image content common to both circular images). This overlapping image content tends to appear along the circumference of the circular images; however, with some disparity (e.g., shifting). In other words, the overlapping image content in each circular image may be the same, but the location of the overlapping image content may be slightly different in each.

In some examples of 360-degree video rendering, a graphics processing unit (GPU) performs texture mapping to generate image content (sequential presentation resulting in video content). For example, the circular images captured by the fisheye lenses form so-called textures having a plurality of texture primitives (e.g., the image content of the circular images is divided into a plurality of primitives such as triangles). The GPU maps these triangles onto a rectangular mesh of primitives to generate an equirectangular image. For example, a vertex of a primitive on the circular image may have the coordinate of (u, v), and for texture mapping, the GPU maps this vertex to a coordinate (x, y) in the rectangular mesh.

In the example techniques, a processing circuit (e.g., CPU, DSP, or some combination of circuits, including the GPU itself) determines the mapping of coordinates of vertices of primitives in the circular images to coordinates in the rectangular mesh by taking into account the rolling shutter and characteristics of the circular images. For example, a memory may store information indicating which points on the circular images would be within the overlapping portion (e.g., those near the outer border), and which points on the circular images would not be within the overlapping portion (e.g., those closer to the center of the image). As an example, the memory may store coordinate information indicating whether a coordinate is within the overlapping portion or not within the overlapping portion. Then, when the image is captured, the pixels in the image having the coordinates within the overlapping portion are identified as being in the overlapping portion, and the pixels in the image having the coordinates that are not within the overlapping portion are identified as not being the overlapping portion. The processing circuit may determine a plurality of overlapping bands (also called pencil bands) in the circular images.

An overlapping band is a horizontal band of pixels from one or more rows of pixels that resides in the portion of a circular image that overlaps with a portion of the other circular image. For instance, each row of pixels in the circular image includes two overlapping bands: one on the left end, and the other on the right end. A horizontal band is one example of an overlapping band, and other examples of an overlapping band are possible, including vertical or diagonal bands.

The processing circuit may compare a horizontal band in a first circular image with a corresponding horizontal band in a second circular image. The corresponding horizontal band is a horizontal band in the second circular image located in the same relative location as the horizontal band in the first circular image. Because of the disparity in the image content, there may not be perfect overlap in the horizontal bands from the circular images (e.g., the image content may not be the same in the horizontal bands). The processing circuit may shift, stretch, rotate, etc. image content of a horizontal band in one of the circular images until it matches the image content of its corresponding horizontal band in the other circular image, or the processing circuit may shift, stretch, rotate image content of both horizontal bands until the image content matches. The processing circuit may repeat these operations for each row.

The result of this process may be two circular images, where the image content in the overlapping portion in at least one of the images, but may be both images, is modified. The processing circuit may determine a location of where vertices of the primitives in the modified circular image(s) are to be mapped. For instance, the processing circuit may utilize information that indicates the delay for when image content is captured for each row to determine the location where vertices of primitives in the row should be mapped to address shutter delay. In addition, in some examples, the processing circuit may utilize information that indicates movement of the camera device to determine the location where vertices of primitives in the row should be mapped to address lack of stabilization. The information for the shutter delay and camera device movement may be part of the same information or may be separate information.

In some examples, the processing circuit may provide information of where each of the vertices are to be mapped, and provide the original circular images to the GPU for the texture mapping. In such examples, although the processing circuit determined where each of the vertices are to be mapped based on a modified image, the texture mapping still occurs with the original circular images. In some examples, the processing circuit may provide information of where each of the vertices are to be mapped, and provide the modified circular images to the GPU for texture mapping.

The information for camera device movement and shutter delay is the amount of rotation for stabilization and rolling shutter correction. One example of the camera device movement and shutter delay is the function R(t+d), R(t+2d), and so forth. The movement of the camera device (e.g., in any direction in the three-dimensional space) is obtained typically via processing measurements of one or more inertial measurement units (IMUs). For example, R(t+d) is a function that indicates the amount of a movement at a given time "t", and "d" indicates a line associated with the movement (e.g., d is the first line, 2d is the second line, and so forth). The stabilization and rolling shutter correction is independent of the modification performed in the overlapping region.

In some cases, if the GPU were to perform the texture mapping using the above techniques, there is a possibility that "holes" will be present in the final image, where a hole is a portion of the image that is dark (e.g., there is no image content for that portion). To address such issues, in some examples, the processing circuit, prior to the GPU performing the texture mapping, may determine whether the texture mapping and subsequent rendering would generate holes. If so, for those vertices where texture mapping and rendering would generate holes, the processing circuit may further modify the location where the GPU is to texture map the vertices.

One way to determine if holes would be created is for the processing circuit to track where vertices in a column of the circular images are being mapped. For example, a row of pixels in a circular image includes the same v coordinate (which is a substitute of y), but a different u coordinate (which is substitute of x). If after mapping (e.g., warping/rotation), the order of the x-coordinates is not preserved on the rectangular mesh (e.g., rather than being next to the previous pixel, it is above or below), then this may indicate that the vertices have flipped. The same may be true for a column of pixels where, rather than a vertex being below another vertex, it is next to the vertex.

Another way to determine if holes would be created is for the processing circuit to use cross-products. For example, the processing circuit may determine cross-products between edges of two adjacent primitives that share an edge (e.g., the hypotenuse of the two primitives may be the same, one of the sides of the two primitives may be the same, etc.). If the cross-products for the edges in the circular images are both positive, but one cross-product of the edges based on where the GPU is to map the vertices is positive and the other negative, then the processing circuit may determine that a hole would be created if texture mapping is applied. To avoid the creation of the hole, the processing circuit may redefine new primitives to cover the area that would have had the hole.

FIG. 1 is a block diagram illustrating an example device for capturing 360-degree image content in accordance with one or more example techniques described in this disclosure. As illustrated, computing device 10 is a video capture device that includes fisheye lens 12A and fisheye lens 12B located on opposite sides of computing device 10 to capture full 360-degree video content. Other orientations of fisheye lenses 12A and 12B may be possible. As described above, the 360-degree video content may be considered as a sequence of 360-degree images (e.g., frames of the video). The examples in this disclosure describe techniques related to the images, which can be used for purposes of still images (e.g., a 360-degree snapshot) or for images that form a video (e.g., a 360-degree video).

A viewer may interact with computing device 10 to capture the 360-degree video/image, where each one of fisheye lenses 12A and 12B captures a portion of the 360-degree video/image, and the two video/image streams from the fisheye lenses 12A and 12B are blended together to create a stitched 360-degree video/image. In some cases, the blending/stitching together of the video/image streams may cause a visible seam between the two streams.

For example, each one of fisheye lenses 12A and 12B captures image content of a hemisphere worth of view, and typically a little bit more than a hemisphere worth of view. A graphics processing unit (GPU) or some other processing circuit of device 10 or some other device maps the corresponding images (referred to as fisheye images) to a sphere and stitches the two hemispheres together. Device 10 may then stream the stitched sphere to a separate display. An example of the display is a head mounted display (HMD), but other displays are possible such as those for a laptop, desktop, tablet, etc. In some examples, device 10 may include the HMD. Furthermore, in some examples, device 10 may output the stitched spheres to a server or other storage device, and the HMD device may retrieve the stitched spheres for display from the server or storage device (e.g., via a wired or wireless connection). Although the examples are described with respect to an HMD, the techniques are not limited to examples where an HMD is used, and may be extended generally to examples where image content is displayed such as on other types of computing devices where a viewer may view image content.

It may be possible for device 10 to output the fisheye images prior to mapping and stitching to another device (e.g., the HMD device, the server, or storage device). The HMD device may then map and stitch the fisheye images for display, or the server may include a GPU that maps and stitches the fisheye images, and the HMD device retrieves the mapped and stitched fisheye images.

The techniques described in this disclosure may be performed by device 10, the HMD device, the server, or possibly some other device. For ease of description, the examples are described with respect to device 10. However, the techniques should not be considered so limiting.

There may be various ways in which a viewer interacts with computing device 10. As one example, the viewer may interact with computing device 10 with a push button located on computing device 10. As another example, a viewer may interact with computing device 10 via a touchscreen and a displayed interface (e.g., graphical user interface (GUI)).

In some examples, computing device 10 may be a camera device (e.g., fisheye camera device) that provides no display and may or may not have onboard processing capabilities. In some examples, computing device 10 outputs the captured image to another device for processing (e.g., a processing device, an example of which is the HMD device). This processing device may provide the primary or secondary mechanism for viewer interaction. For example, the viewer may execute an application on the processing device that causes computing device 10 to synchronize with the processing device, where the processing device is the master and computing device 10 is the slave. The viewer may then, via the processing device, cause computing device 10 to capture a 360-degree image, and computing device 10 outputs the images back to the processing device for display. In some examples, even when a processing device is used to capture the 360-degree image, the viewer may still interact with computing device 10 for capturing the 360-degree image but computing device 10 will output the image to the processing device for display.

FIGS. 2A and 2B are pictorial diagrams illustrating an image captured from the device of FIG. 1. As illustrated, the output of the two images captured by lenses 12A and 12B are circular images (e.g., round images). For example, FIG. 2A represents the image captured by lens 12A, and FIG. 2B represents the image captured by lens 12B. In response to a viewer interaction to capture an image, a camera processor, illustrated in FIG. 6 receives the image content captured by lenses 12A and 12B and processes the image content to generate FIGS. 2A and 2B. In some examples, FIGS. 2A and 2B may be part of a common image frame.

As illustrated, FIGS. 2A and 2B are circular images illustrating image content that appears bubble-like. If the two circular images are stitched together, the resulting image content would be for the entire sphere of image content (e.g., 360-degree of viewable content).

However, the images captured by lenses 12A and 12B encompass more than half of the 360-degree of viewable content. To capture half of the 360-degree of viewable content, lens 12A would have captured 180-degree of the 360-degrees of viewable content, and lens 12B would have captured the other 180-degree of the 360-degrees of viewable content. In some examples, lenses 12A and 12B may each capture more than 180-degrees of the 360-degrees of viewable content. For instance, lenses 12A and 12B may capture approximately 195-degrees of the viewable content (e.g., content slightly behind the side of computing device 10 and extending all around).

Figure 6:
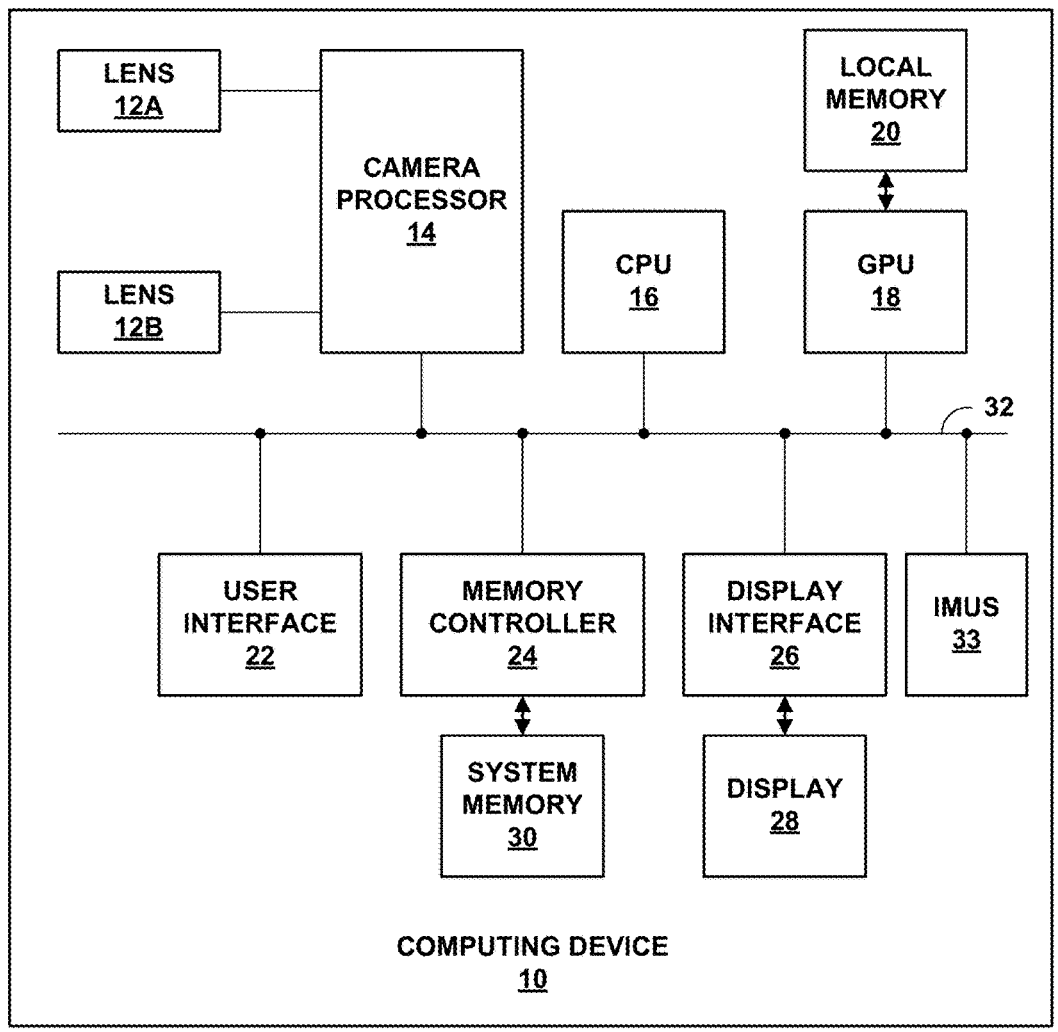
FIG. 6 is a block diagram of a device configured to perform one or more of the example techniques described in this disclosure.

Because each of lenses 12A and 12B capture more than 180-degrees of the 360-degrees of viewable content, there is some image content overlap in the images captured by lenses 12A and 12B. Imprecise stabilization and rolling shutter may cause wobble in video content. If the video content wobbles, the viewer may experience discomfort such as nausea. In the example techniques described in this disclosure, a graphics processing unit (GPU), as illustrated in FIGS. 6 and/or 8, may utilize this overlap in image content to correct for wobble due to imprecise stabilization and rolling shutter.

Imprecise stabilization refers to movement of device 10 due to the movement of the user's hands while capturing the image. In this case, each captured image may be captured from a slightly different orientation, and when the images are presented sequentially, the video content may appear to wobble.

Device 10 may include one or more inertial measurement units (IMUs) that measure the orientation of device 10. Examples of IMUs include accelerometers and gyroscopes, but other examples of IMUs exist as well. The IMUs may measure the orientation of device 10 with respect to a common reference (e.g., fixed orientation). Processing circuit of device 10, such as the GPU, may compensate for the imprecise stabilization by rotating the images in the inverse direction as the direction in which device 10 rotated based on the change of orientation measured by the one or more IMUs.

Rolling shutter (or rolling shutter delay) refers to the characteristics of fisheye lenses 12A and 12B where the sensors (e.g., CMOS sensors) in a row of fisheye lenses 12A and 12B capture image content at slightly different times. For example, FIGS. 2A and 2B illustrate row 13A and row 13B of pixels, each corresponding to image captured by respective sensor rows. Row 13A may represent image content captured by a first sensor row at time t, and row 13B, which is "k" rows after row 13A, may represent image content captured by a second sensor row at time t+k*Δ, where Δ refers to a temporal delay between when image content is captured between a row and the immediately following row.

Each row in images captured by fisheye lenses 12A and 12B together form a band in the camera sphere. For instance, as described above, a GPU may map each of the images captured by fisheye lenses 12A and 12B onto a sphere to generate the 360-degree image content. In some examples, there may be an intermediate step where the GPU first maps each of the images captured by fisheye lenses 12A and 12B onto an equirectangular mesh to generate an equirectangular image, and then map the equirectangular image to the sphere to generate the 360-degree image content. In either case, one row across images captured by fisheye lenses 12A and 12B form a band (e.g., horizontal or vertical ring) in the 360-degree image content. For example, the image content represented by row 13A forms one band in the 360-degree image content, where row 13A extends between both images captured by fisheye lenses 12A and 12B, and the image content represented by row 13B forms another band in the 360-degree image content, where row 13B extends between both images captured by fisheye lenses 12A and 12B.

Figure 3B:
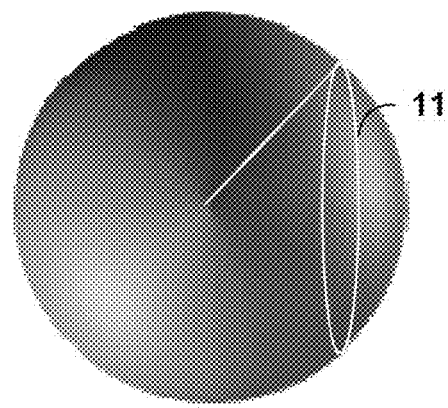

FIGS. 3A and 3B are conceptual diagrams illustrating mapping of a point on a circular image to a band in a sphere. For instance, FIG. 3A represents a circular image like one of FIG. 2A or 2B, and illustrates a pixel "x" a distance "u" away from the center of the circular image. For example, the circular image illustrated in FIG. 3A has a radius identified by r1, max, where r1 represents a line segment, and max represents the maximum size of the line segment (e.g., from center to perimeter). The pixel x will be located along a line segment that extends from the center of the circular image to a perimeter of the circular image. In the illustrated example, the pixel x is a distance u away from the center, and identified by r1(u), where u represents the distance from center.

Figures 14A, 14B:
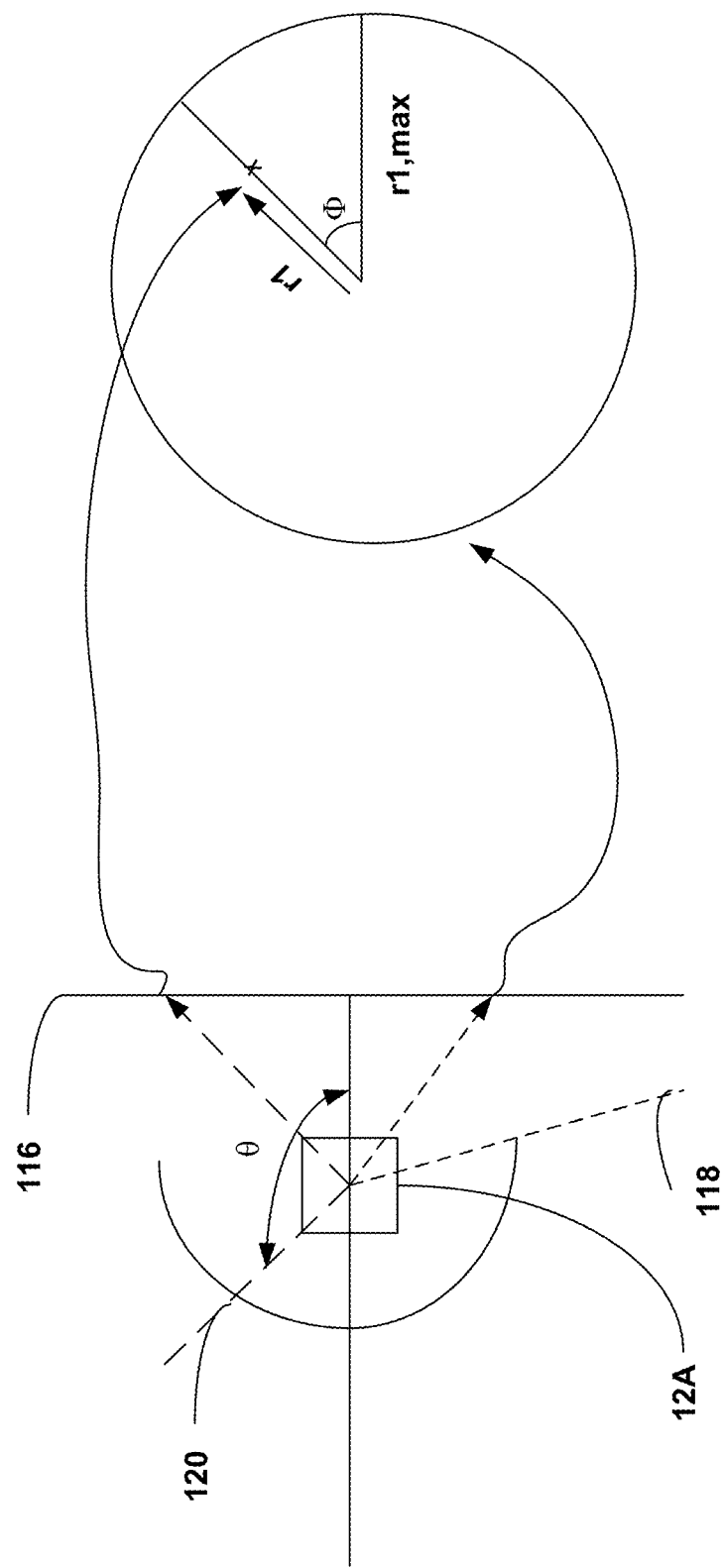
FIGS. 14A-14C are conceptual diagrams illustrating conversion of coordinates of a point on a circular image to coordinates on a sphere.
Figure 14C:
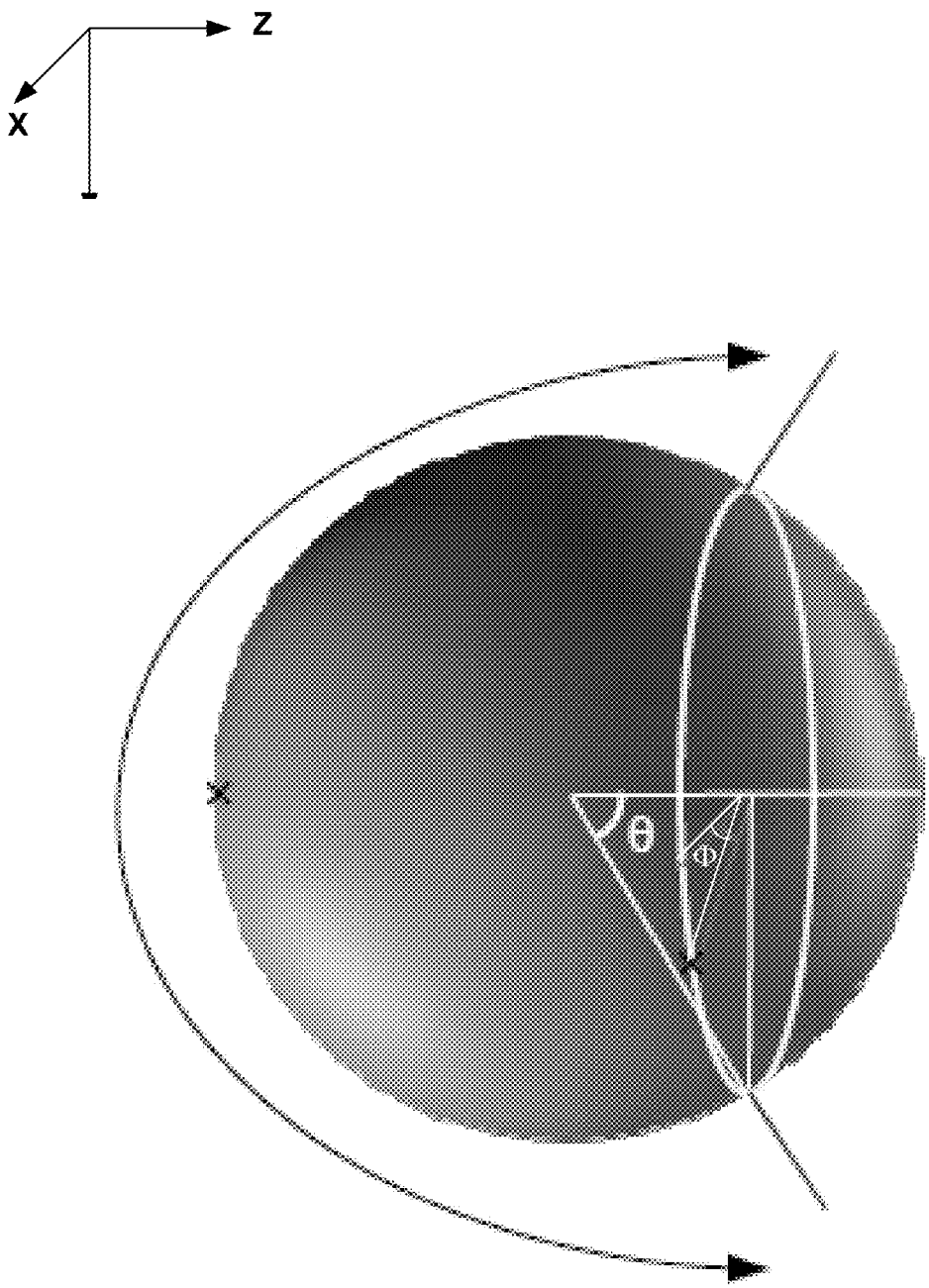

As described above, the GPU may map each point on the circular image to a location on a sphere that displays the 360-degree image content. The band to which a row of pixels is mapped may be based on an "Equidistant" fisheye model, but other models are possible for determining the band to which a row of pixels is mapped. FIGS. 14A-14C refer to example techniques for mapping a point on a circular image to a sphere.

FIG. 3B illustrates one example band 11 to which a row of pixels is mapped. For example, pixels in the row that includes pixel x may be mapped to band 11 in the sphere, as illustrated in FIG. 3B.

In general, for every point (e.g., pixel) in the sphere of image content, there is one point (e.g., pixel) on one of the two fisheye images (e.g., one of FIG. 2A or 2B) or on both (e.g., both of FIGS. 2A and 2B), such as the point in the overlapping region of the two fisheye images. The GPU may stitch the two fisheye images to form a full wrap around the sphere of image content (e.g., by texture mapping pixels in the fisheye images to a spherical mesh of polygons). In some examples, the GPU may first convert each of the fisheye images (e.g., circular images) to equirectangular images (e.g., by texture mapping the fisheye images to a rectangular mesh of polygons), stitch the equirectangular images, and then texture map the stitched equirectangular image to a spherical mesh of polygons to form the sphere of image content. In these examples, there is a point on the sphere of image content that corresponds to a point in one or both of the fisheye images.

FIGS. 4A and 4B are conceptual diagrams illustrating differences between global and rolling shutter. FIG. 4A illustrates image content captured from rolling shutter, and FIG. 4B illustrates image content captured from global shutter. Global shutter refers to all sensor rows capturing image content at the same time. As described above, rolling shutter refers to each sensor row capturing image content one at a time, and hence, each sensor row captures image content at slightly different times.

In both FIGS. 4A and 4B, the images appear skewed due to the circular nature of the images. With the example of global shutter in FIG. 4B, the top and bottom of the illustrated stick align (e.g., the top point of the stick is in the same column as the bottom point of the stick). However, in the rolling shutter example illustrated in FIG. 4A, the top point of the stick and the bottom point of the stick do not align. Rather, in FIG. 4A, the image appears sheared with the bottom of the image appearing to be pulled to the right relative to the top of the image.

For example, FIGS. 4A and 4B illustrate alignment lines 13A and 13B, which are both the exact same vertical lines. As can be seen in FIG. 4B, the top of alignment line 13B touches the top of the stick, and the bottom of alignment line 13B touches the bottom of the stick, illustrating that top point of the stick is in the same column as the bottom point of the stick, meaning that the top and bottom of the stick is aligned. However, as can be seen in FIG. 4A, the top of alignment line 13A touches the top of the stick, but the bottom of alignment line 13A does not touch the bottom of the stick. Rather, alignment line 13A intersects the stick illustrated in FIG. 4A. Therefore, the top point of the stick in FIG. 4A does not align with the bottom point of the stick in FIG. 4A.

Therefore, the orientation of the image content in the rolling shutter example of FIG. 4A may not be accurate at least as compared to the orientation of image content in the global shutter example of FIG. 4B. The example techniques described in this disclosure may correct this distortion caused by the rolling shutter, which can manifest as wobble when images are viewed sequentially, such that the image content appears more similar to image content captured using global shutter (e.g., reducing the appearance of wobble).

Figure 5B:
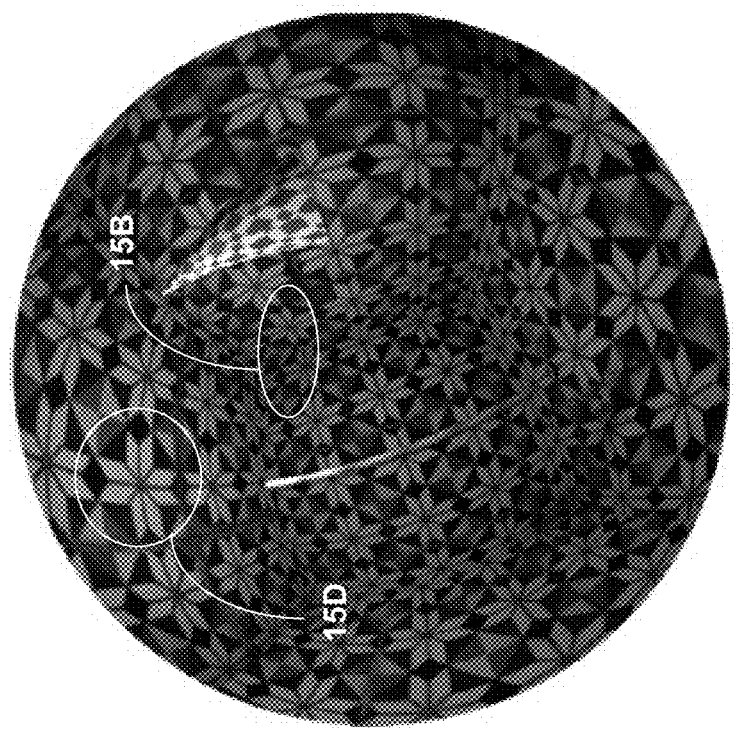
FIGS. 5A and 5B are conceptual diagrams illustrating differences between global and rolling shutter.
Figure 5A:
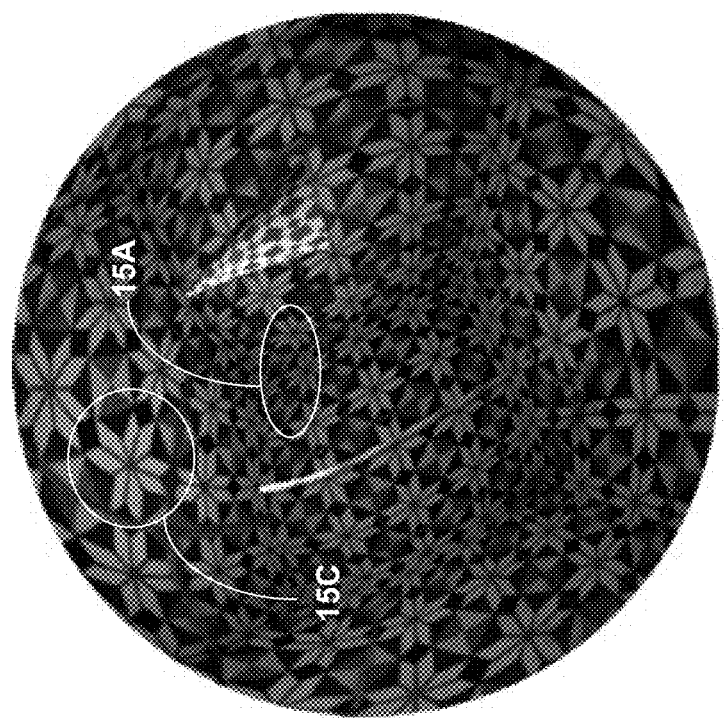

FIGS. 5A and 5B are conceptual diagrams illustrating differences between global and rolling shutter. Similar to FIGS. 4A and 4B, FIG. 5A illustrates an example where image content is captured using the rolling shutter, and FIG. 5B illustrates an example where image content is captured using the global shutter.

In the example illustrated in FIG. 5A, the shear in the background texture may be due to rolling shutter and is visible roughly in the center of the image between the top of the cone and the stick, illustrated by reference numerals 15A and 15B. Also, the image content in the top (e.g., the flower like patterns) have contours that are more curved in the example illustrated in FIG. 5A as compared to the example illustrated in FIG. 5B. For example, the image content illustrated by reference numeral 15C in FIG. 5A is more curved than the image content illustrated by reference numeral 15D in FIG. 5B.

FIG. 6 is a block diagram of a device configured to perform one or more of the example techniques described in this disclosure. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone for teleconferencing, an Internet telephone, a handheld device such as a portable video game device or a personal digital assistant (PDA). Additional examples of computing device 10 include a personal music player, a video player, a display device, a camera, a television, a set-top box, a broadcast receiver device, a server, an intermediate network device, a mainframe computer or any other type of device that processes and/or displays graphical data.

As illustrated in the example of FIG. 6, computing device 10 includes first fisheye lens 12A and second fisheye lens 12B, at least one camera processor 14, a central processing unit (CPU) 16, a graphical processing unit (GPU) 18 and local memory 20 of GPU 18, user interface 22, memory controller 24 that provides access to system memory 30, display interface 26 that outputs signals that cause graphical data to be displayed on display 28, and one or more inertial measurement units (IMUs) 33. Although FIG. 6 illustrates fisheye lenses 12A and 12B as part of the same device that includes GPU 18, the techniques described in this disclosure are not so limited. In some examples, GPU 18 and many of the various other components illustrated in FIG. 6 may be on a different device (e.g., a processing device), where the captured video content from lenses 12A and 12B is outputted to the processing device that includes GPU 18 for post-processing and blending of the image content to generate the 360-degree video/image.

While the example techniques are described with respect to two fisheye lenses, the example techniques are not so limited, and are applicable to the various camera types used for capturing 360-degree images/videos. In some examples, computing device 10 may include a plurality of fisheye lenses (e.g., more than fisheye lenses 12A and 12B).

Also, although the various components are illustrated as separate components, in some examples the components may be combined to form a system on chip (SoC). As an example, camera processor 14, CPU 16, GPU 18, and display interface 26 may be formed on a common integrated circuit (IC) chip. In some examples, one or more of camera processor 14, CPU 16, GPU 18, and display interface 26 may be in separate IC chips. Various other permutations and combinations are possible, and the techniques should not be considered limited to the example illustrated in FIG. 6.

The various components illustrated in FIG. 6 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 6 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 6 is merely exemplary, and other configurations of computing devices and/or other image processing systems with the same or different components may be used to implement the techniques of this disclosure.

Camera processor 14 may be external to computing device 10; however, it may be possible for camera processor 14 to be internal to computing device 10, as illustrated. For ease of description, the examples are described with respect to the configuration illustrated in FIG. 6.

Camera processor 14 is configured to receive electrical currents as sensor signals from respective pixels of lenses 12A and 12B and process the electrical currents to generate pixel data of respective fisheye images (e.g., the circular images). Although one camera processor 14 is illustrated, in some examples, there may be a plurality of camera processors (e.g., one for lens 12A and one for lens 12B). Accordingly, in some examples, there may be one or more camera processors like camera processor 14 in computing device 10.

In some examples, camera processor 14 may be configured as a single-input-multiple-data (SIMD) architecture. Camera processor 14 may perform the same operations on current received from each of the sensors on each of lenses 12A and 12B. Each lane of the SIMD architecture may include an image pipeline. The image pipeline includes hardwire circuitry and/or programmable circuitry (e.g., at least one of fixed-function or programmable circuitry) to process the output of the sensors to generate pixel values for pixels to be in a displayed image.

For example, each image pipeline of camera processor 14 may include respective trans-impedance amplifiers (TIAs) to convert the current to a voltage and respective analog-to-digital converters (ADCs) that convert the analog voltage output into a digital value. The current outputted by each pixel indicates the intensity of a red, green, or blue component.

In addition to converting analog current outputs to digital values, camera processor 14 may perform some additional post-processing to increase the quality of the final image. For example, camera processor 14 may evaluate the color and brightness data of neighboring image pixels and perform demosaicing to update the color and brightness of the image pixel. Camera processor 14 may also perform noise reduction and image sharpening, as additional examples.

Camera processor 14 outputs the resulting images (e.g., pixel values for each of the image pixels) to system memory 30 via memory controller 24. Each of the images may be combined together to form the 360-degree video/images. For example, GPU 18 or some other processing unit, including camera processor 14 itself, may perform the blending to generate the video content. For ease of description, the examples are described with respect to the processing circuitry of GPU 18 performing the operations. However, other processing circuitry may be configured to perform the example techniques. In some cases, GPU 18 may combine the images and generate the 360-degree video/images in or near real-time, but in other examples, the operations of combining the images to generate the 360-degree video/ images need not be in real-time.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a word processor application, a web browser application, an email application, a graphics editing application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user interface 22.

One example of the software application is a camera application. CPU 16 executes the camera application, and in response, the camera application causes CPU 16 to generate content that display 28 outputs. For instance, display 28 may output information such as light intensity, whether flash is enabled, and other such information. The user of computing device 10 may interface with display 28 to configure the manner in which the images are generated (e.g., with or without flash, focus settings, exposure settings, and other parameters). The camera application also causes CPU 16 to instruct camera processor 14 to process the images captured by lenses 12A and 12B in the user-defined manner.

The software applications that execute on CPU 16 may include one or more graphics rendering instructions that instruct GPU 18 to cause the rendering of graphics data for storage in system memory 30 and/or for display on display 28. In some examples, the software instructions may conform to a graphics application programming interface (API), such as, e.g., an Open Graphics Library (OpenGL®) API, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

As one example, the user may execute the camera application and interact with computing device 10 to capture the 360-degree video. After camera processor 14 stores the resulting images (e.g., the circular images of FIGS. 2A and 2B) in system memory 30, the camera application may cause CPU 16 to instruct GPU 18 to render and blend the images. The camera application may use software instructions that conform to an example API, such as the OpenGL API, to instruct GPU 18 to render and blend the images. As an example, the camera application may issue texture mapping instructions according to the OpenGL API to cause GPU 18 to render and blend the images.

In response to the received instructions, GPU 18 may receive the image content of the circular images and blend the image content to generate the 360-degree images/video. GPU 18 may store the resulting images in system memory 30 and/or output the images to a server via wired or wireless techniques. In some examples, display 28 displays the 360-degree images/video. The user may interact with user interface 22 to modify the viewing perspective so that the viewer can view the full 360-degree video (e.g., view above, behind, in front, and all angles of the 360 sphere).

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 24 is illustrated in the example of computing device 10 of FIG. 6 as being a processing circuit that is separate from both CPU 16 and system memory 30, in other examples, some or all of the functionality of memory controller 24 may be implemented on one or both of CPU 16 and system memory 30.

System memory 30 may store program modules and/or instructions and/or data that are accessible by camera processor 14, CPU 16, and GPU 18. For example, system memory 30 may store user applications (e.g., instructions for the camera application), resulting images from camera processor 14, etc. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 30 may include instructions that cause camera processor 14, CPU 16, GPU 18, and display interface 26 to perform the functions ascribed to these components in this disclosure. Accordingly, system memory 30 may be a computer-readable storage medium having instructions stored thereon that, when executed, cause one or more processors (e.g., camera processor 14, CPU 16, GPU 18, and display interface 26) to perform various functions.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display interface 26 may retrieve the data from system memory 30 and configure display 28 to display the image represented by the generated image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

As described above, in the example techniques described in this disclosure, processing circuit (e.g., GPU 18 or some combination of one or more of CPU 16, GPU 18, display interface 26, etc.) may be configured to address movement of device 10 and shutter delay of lenses 12A and 12B. For ease of description, the example techniques are described as being performed by CPU 16 and GPU 18.

One example way in which to determine movement of device 10 is via one or more IMUs 33. Each one of IMUs 33 may output information indicative of the force, angular rate, and like using a combination of accelerometers and gyroscopes. For example, IMUs 33 may detect the current rate of acceleration using the accelerometers, and detect changes in rotational attributes such as pitch, roll, and yaw using gyroscopes.

In some examples, during manufacturing, prior to first use, each time device 10 is turned on, or periodically, IMUs 33 may orient to a common reference. For instance, IMUs 33 may detect the gravitational force to determine the downward direction. IMUs 33 may then detect movement relative to this reference.

IMUs 33 may determine the direction of earth relative to the current orientation of device 10. For instance, assume that device 10 is in the orientation illustrated in FIG. 1. In this example, IMUs 33 may determine the downward direction relative to the orientation of device 10. For instance, IMUs 33 may determine that device 10 is being pulled downward from gravitation from the earth where lenses 12A and 12B are at the top of device 10 and device 10 is 90-degrees relative to the earth. CPU 16 may assign this particular orientation of device 10 as a "common reference." the common reference may be a particular orientation of device 10 from which the user is likely to take images (e.g., such as the orientation illustrated in FIG. 1).

However, device 10 may move from such a common reference. For instance, during image capture, the user may slightly move device 10 so that device 10 is not in the orientation illustrated in FIG. 1. In this case, the camera sensors in lenses 12A and 12B. In such cases, IMUs 33 may determine the downward gravitational force, and determine that device 10 is not 90-degrees relative to the earth such as where device 10 is tilted forward or backward. Accordingly, IMUs 33 may determine movement of device 10 from a common reference, which includes movement of camera sensors.

There may be other ways in which IMUs 33 may determine movement from the common reference (e.g., movement of device 10 from the orientation illustrated in FIG. 1). Using gravitational forces to determine movement from the common reference is merely one example.

CPU 16 may receive information indicative of the movement of device 10 from IMUs 33 (e.g., receive information of the pitch, roll, and/or yaw and/or acceleration). Based on movement of device 10, CPU 16 (e.g., via execution of the camera application or possibly with the operating system) may generate commands that instruct GPU 18 to rotate the image in the direction opposite to the movement of device 10. As one example, GPU 18 may utilize texture mapping techniques to rotate the image in the direction opposite to the movement of the device 10. In texture mapping, GPU 18 may map the image to points on a mesh that cause the image to rotate. In some examples, the vertices in the image are rotated, and therefore, the image is rotated.

IMUs 33 may detect movement of device 10 relative to a common reference, and output information that indicates the direction of the movement and by how much device 10 moved in that direction. As an example, IMUs 33 may output information indicative of the orientation of device 10 when device 10 is oriented as illustrated in FIG. 1. For example, IMUs 33 may output the pitch, roll, and yaw of device 10 when device 10 is oriented as illustrated in FIG. 1. CPU 16 may store information of the pitch, roll, and yaw of device 10 when oriented as illustrated in FIG. 1, and classify the information as being the pitch, roll, and yaw of a common reference. IMUs 33 may continuously, periodically, or in response to movement, output pitch, roll, and yaw of device 10. If CPU 16 determines that the pitch, roll, and/or yaw of device 10 is different than the stored pitch, roll, and/or yaw of the common reference, CPU 16 may determine that device 10 moved relative to the common reference. Again, the movement of device 10 includes the movement of camera sensors (e.g., movement of device 10 causes the camera sensors of lenses 12A and 12B to move as well).

CPU 16 may then generate commands (e.g., texture mapping commands) that instruct GPU 18 to turn the image in the opposite direction from the direction in which movement was detected based on how much device 10 moved in that direction. In this way, as part of the rendering of the images, GPU 18 may perform global stabilization of device 10. As described in more detail, GPU 18 may perform such global stabilization on a line-by-line basis (e.g., row-by-row or column-by-column, and/or more generally, per-line) in some examples, such as examples where stabilization and rolling shutter correction is performed together. In some examples, GPU 18 may perform such global stabilization on the entire image such as examples where stabilization and rolling shutter correction are separated out.

To perform rolling shutter correction, CPU 16 and/or GPU 18 may perform operations on the images on a per-line (e.g., line-by-line basis). In this disclosure, line-by-line may be row-by-row or column-by-column based on implementation. Also, a line of image content does not necessarily mean one line of pixels. Rather, the width of the line may be greater than or equal to one line of pixels. For instance, for high levels of rolling shutter correction, the width of a line of image content may be one or two pixels (e.g., one row or column of pixels or two rows or columns of pixels makes one line). However, such "thin" lines may require CPU 16 and GPU 18 to perform extensive processing. For lower levels of rolling shutter correction, the width of a line of image content may be a plurality of pixels (e.g., three or more rows or columns of pixels makes one line).

Memory 30 (or possibly memory local to CPU 16) may store information indicating which pixels in images captured by lenses 12A and 12B are in an overlapping portion and which pixels in images captured by lenses 12A and 12B are in a non-overlapping portion. For example, during manufacturing, based on design of lenses 12A and 12B (e.g., number of sensors and positions of sensors in lenses 12A and 12B), memory 30 may store information indicating whether image content captured by lenses 12A and 12B will be in an overlapping portion or a non-overlapping portion.

The overlapping portion refers to the image content that will exist in image content captured by both lenses 12A and 12B. As described above, each one of lenses 12A and 12B may capture more than 180-degrees of image content, meaning that there will be image content common to both. In general, the overlapping content is present along a circumference of the images. A circumference of the image refers to a band having a particular width along the edge of the images such that the circumference of the image has a same center point as the center point of the images.

Whether image content from a particular sensor is within the overlapping portion or outside of the overlapping portion may be based on its location in lenses 12A and 12B. For example, for sensors located along rings at the edge of lenses 12A and 12B may capture image content for the overlapping portion. Memory 30 may store information indicating locations in the circular images that correspond to the sensors of lenses 12A and 12B that capture image content common to both circular images. For instance, memory 30 may store information that the first N number of pixels starting from the edge of the circular image towards the center are common in the circular images captured by both lenses 12A and 12B because there are N number of sensors from the edge of lenses 12A and 12B to the center, where N is determined based on the location of sensors.

As another example, during manufacturing, a tester (e.g., a test machine that may be used during the calibration of device 10 or a technician that may calibrate during manufacturing of device 10) may capture test images, and software or an individual may evaluate the test images to identify overlapping image content. Memory 30 may store information indicating how many number of pixels starting from the edge of the circular images towards the center are common to both the circular images.

There may be other ways in which to determine which are the overlapping portions and which are the non-overlapping portions, and the example techniques are not limited to the examples provided above. In any event, whether a particular pixel in the circular images is within the overlapping portion or external to the overlapping portion may be a function of the design of lenses 12A and 12B, and remains constant for the particular device 10.

Accordingly, regardless of the actual image content, for pixels in the circular images that are generated by camera processor 14, memory 30 may store information that indicates whether a pixel in a first circular image (e.g., captured by lens 12A) is in the overlapping or non-overlapping portion of the first circular image, and may store information that indicates whether a pixel in a second circular image (e.g., captured by lens 12B) is in the overlapping or non-overlapping portion of the second circular image. Memory 30 need not necessarily store information indicating whether a particular pixel is in the overlapping or non-overlapping portion of a particular image. For instance, memory 30 may store information indicating whether every third or fourth pixel is in the overlapping or non-overlapping portion, and CPU 16 or GPU 18 may extrapolate (e.g., based on the locations of neighboring pixels for which information is stored) whether a particular pixel is within the overlapping portion or within the non-overlapping portion. However, it is possible for memory 30 to store information indicating whether each pixel is within the overlapping or within the non-overlapping portion.

The coordinates for pixels within the circular images (e.g., those of FIGS. 2A and 2B) may be in two-dimensional form (e.g., (x, y)) because the circular images are two-dimensional images. However, because the image content is mapped onto a sphere, CPU 16 and/or GPU 18 may perform operations on three-dimensional coordinates. It should be understood that the example techniques described may be applicable where CPU 16 and/or GPU 18 perform operations on the two-dimensional coordinates, and then convert to three-dimensional coordinates. For illustration, the example techniques are described with respect to operations on three-dimensional coordinates.

For instance, memory 30 may also store three-dimensional coordinates for the two-dimensional coordinates for the pixels in the overlapping and non-overlapping portions of the circular images. However, in some examples, only three-dimensional coordinates for the non-overlapping portions may be needed. As described above, each point in the circular image corresponds to a point on a sphere that is to be rendered for display, and each circular image includes more than half of the image content of a sphere.

Conceptually, this can be understood as the image content for the first image corresponds to a first sub-capsule, and image content for the second image corresponds to a second sub-capsule. A sub-capsule is similar to half of a sphere but elongated at one end to reflect that the sub-capsule corresponds to more than half of the image content of the sphere.

Accordingly, each of the pixels in the circular images corresponds to a location on the sub-capsule. During manufacturing, a tester may determine the location of each pixel in the circular image on the sub-capsule, or based on techniques described with respect to FIGS. 14A-14C, CPU 16 may determine the location of each pixel in the circular image on the sub-capsule. For instance, pixels in the circular images may be defined by their two-dimensional (u, v) coordinates, and CPU 16 may determine their three-dimensional (x, y, z) coordinates of where the pixels are located on the respective sub-capsules (e.g., (x, y, z) coordinates on the first sub-capsule based on the (u, v) coordinates of pixels in the first circular image, and (x, y, z) coordinates for the second sub-capsule based on the (u, v) coordinates of pixels in the second circular image). In this way, memory 30 may store information indicating the correspondence between (u, v) coordinates of pixels in the circular images (e.g., for both the overlapping and non-overlapping portions) and (x, y, z) coordinates for locations on the first and second sub-capsules, respectively.

In some examples, only the (x, y, z) coordinates for the non-overlapping portions may be needed. In such examples, memory 30 may not store (x, y, z) coordinates for the overlapping portions. However, CPU 16 and/or GPU 18 may still determine (x, y, z) coordinates for the overlapping portion but after some adjustment of coordinates.

In examples described in this disclosure, to address the rolling shutter delay, the image content in the overlapping portions of the first and second circular images should overlap on a line-by-line basis. For instance, although the overlapping portions of the first and second circular images may include the same image content, on a line-by-line basis, the overlapping image content may not align. The image content in the overlapping portions may be the same, but there may be disparity on a line-by-line basis. As an example, image content in a first line of the overlapping portion of the first circular image need not be the same as the image content on the corresponding line of the overlapping portion of the second circular image. Here, corresponding line means a line in the same position in the second circular image as the position of the first line in the first circular image. Rather, the image content in the first line of the overlapping portion of the first circular image may be located elsewhere in the overlapping portion of the second circular image.

In this disclosure, CPU 16 and/or GPU 18 may warp (e.g., shift, rotate, stretch, or otherwise modify) image content in the overlapping portions of at least one of the first or second circular images until the image content overlaps. For instance, CPU 16 and/or GPU 18 may extract a band of pixels (also called a pencil band of pixels). A band of pixels may be a line of pixels from an overlapping portion of the first or second circular image. The band of pixels may be relatively thin (e.g., width of a few pixels) in some examples.

For example, one or more processing circuits (e.g., CPU 16 and/or GPU 18) may receive image content for a first set of bands of a first overlapping portion of a first image, and a second set of bands of a second overlapping portion of a second image. The first overlapping portion and the second overlapping portion may include overlapping image content but not necessarily in the same respective positions. The one or more processing circuits may adjust image content in at least one of the first set of bands or second set of bands until the image content in the first set of bands overlaps with image content in the second set of bands to generate a set of overlapping bands.

As an example, in the first circular image, the overlapping portion is around the circumference of the first circular image. This overlapping portion may be divided into a plurality of lines. Because the overlapping portion does not encompass the entirety of the circular image, each of the plurality of lines may be disjointed. For example, there may be a left half of a line for the overlapping portion, and a right half of the line. Each of these lines forms a so-called "pencil band," and each overlapping portion in the first and second images includes respective sets of bands (sets of pencil bands). The pencil band may be a combination of the left and right halves of the line for the overlapping portion, or one pencil band may be the left half of the line for the overlapping portion, and one pencil band may be the right half of the line for the overlapping portion.

There may be various ways in which CPU 16 and/or GPU 18 may adjust the image content to determine that the image content in the first set of bands of the first overlapping portion overlaps with the image content in the second set of bands of the second overlapping portion. As one example, CPU 16 and/or GPU 18 may operate on the two-dimensional coordinates of the image content. For instance, GPU 18 may add a disparity value to the u and v-coordinates for each pixel in the first set of bands of the first overlapping portion of the first image. GPU 18 may then determine a difference between the color values of pixels in the first set of bands and color values of pixels in the second set of bands, and keep adjusting the disparity value until the difference is minimized.

As an example, GPU 18 may add 2 to the u-coordinate and 3 to the v-coordinate for pixels in the first set of bands of the first overlapping portion. In this example, assume that a pixel located at (1, 4) in the first overlapping portion has a particular color value (e.g., red-green-blue value) of X. GPU 18 may add 2 to 1, and 3 to 4 to result in a new coordinate value of (3, 7). GPU 18 may determine the difference between the X and the color value of the pixel located at (3, 7) in the second overlapping portion. GPU 18 may repeat these operations with different disparity values until identifying the disparity value that results in the smallest difference. In this example, the first set of bands can be considered as overlapping the second set of bands because the image content (e.g., color values) for corresponding pixels in the first and second sets of bands is approximately equal.

In the above example, GPU 18 adjusts image content until the difference in color values is minimized. There may be other adjustment techniques to determine when the first set of bands and second set of bands overlap. As one example, GPU 18 may use a sum of absolute differences. Other such techniques exist and are contemplated by the disclosure.

GPU 18 may add the determined disparity value to all pixels in the overlapping portion of the first set of bands to generate a set of overlapping bands. It should be understood that the disparity need not be constant for each pixel, and GPU 18 may add different amounts of disparity to different pixels. Also, in the above example, GPU 18 is describing adjusting image content on a pixel-by-pixel basis. However, the techniques are not so limited.

For example, GPU 18 may adjust image content for a patch of pixels across multiple overlapping bands. In this case, GPU 18 may add disparity to the pixels of a patch of pixels in a plurality of overlapping bands in the overlapping portion of the first image, and compare the difference in the color values between the patch of pixels and a patch of pixels in the overlapping portion of the second image. GPU 18 may repeat these operations for the patch of pixels in the overlapping portion of the first image until a corresponding patch of pixels is identified in the overlapping portion of the second image, and repeat these operations for all patches of the pixels in the overlapping portion of the first image.

Although the above example describes adding disparity to the first set of bands (e.g., adjusting image content of the first set of bands) until the image content in the first set of bands overlaps with image content in the second set of bands to generate the set of overlapping bands, the techniques are not so limited. In some examples, GPU 18 may add disparity to the second set of bands (e.g., adjust image content of the second set of bands) until the image content in the second set of bands overlaps with image content in the first set of bands to generate the set of overlapping bands, or may add disparity to both the first and second set of bands to generate the set of overlapping bands.

One potential benefit of generating the set of overlapping bands may be to reduce ghosting effects. For instance, as described above, the image content in the overlapping bands is the same, but there is disparity. Using the above techniques to determine the disparity (e.g., based on minimizing differences in pixel values), GPU 18 may be able to rotate image content so that the images line up. If GPU 18 did not perform such rotation of image content, and blended without the rotation, there would be ghosting effects.

The final image that is rendered for display is based on a blending of the image content in the first and second images, such as at the overlapping bands. If GPU 18 were to blend a pixel at a particular location in the overlapping portion of the first image with a pixel in the overlapping portion of the second image having the same location without accounting for the disparity, then the blending may not be ideal because the image content of the pixel in the overlapping portion of the first image and image content of the pixel in the overlapping portion of the second image is not the same (e.g., due to the disparity). This imperfect blending results in a ghosting effect where the pixels appear semi-translucent. However, by adjusting pixels to generate the set of overlapping bands, then the blending may be better as compared to blending without adjustment, resulting in less of a ghosting effect.

The coordinates for the pixels in the resulting generated set of overlapping bands may be in two-dimensional coordinates. In some examples, CPU 16 and/or GPU 18 may convert the two-dimensional coordinates to three-dimensional coordinates in a manner similar to the above description of converting two-dimensional coordinates to three-dimensional coordinates for the non-overlapping portions. For instance, CPU 16 and/or GPU 18 may determine the locations of the pixels in the set of overlapping bands on the sub-capsule, and determine the three-dimensional coordinates of the pixels on the sub-capsule. CPU 16 and/or GPU 18 may store the three-dimensional coordinates of the pixels in the set of the overlapping bands in memory 30.

In this way, memory 30 may store three-dimensional coordinates of pixels in the overlapping portions of the first and second images. Memory 30 may store these three-dimensional coordinates of pixels in the non-overlapping portions of the first and second images during manufacturing (e.g., does not need to be determined during runtime of the camera application, but possible to be determined during runtime). Memory 30 may also store three-dimensional coordinates of pixels in the set of overlapping bands, which has similar image content as the first and second overlapping portions but with adjustment on the location of the image content or some form of stretching of the image content. The storage of the three-dimensional coordinates of pixels in the set of overlapping bands may be performed during runtime such as in response to the execution of the camera application.

In examples where GPU 18 generates the set of overlapping bands based on the first image, GPU 18 may not perform such operations on the second image because the set of overlapping bands already overlap (e.g., color values for pixels in the set of overlapping bands are substantially equal to color values for pixels in corresponding locations in the set of bands in the overlapping portion of the second image). Similarly, in examples where GPU 18 generates the set of overlapping bands based on the second image, GPU 18 may not perform such operations on the first image because the set of overlapping bands already overlap (e.g., color values for pixels in the set of overlapping bands are substantially equal to color values for pixels in corresponding locations in the set of bands in the overlapping portion of the first image).

In example techniques described in this disclosure, CPU 16 and/or GPU 18 may map the pixels of the non-overlapping portion having the three-dimensional coordinates and the pixels in the set of overlapping bands to a two-dimensional mesh to generate coordinates for an equirectangular image. For example, as described above, to generate the 360-degree image or video content, GPU 18 may map image content from the first image (e.g., FIG. 2A) onto a first rectangular mesh to generate a first equirectangular image, and map image content from the second image (e.g., FIG. 2B) onto a second rectangular mesh to generate a second equirectangular image. The first and second rectangular meshes may be instances of the same rectangular mesh. Content in the overlapping regions of the images may map to the same region in the rectangular meshes and may be blended appropriately. The mapping of the image content to the coordinates for the equirectangular mesh may compensate for at least one of the device movement or rolling shutter delay during the capturing of the image content.

One example of such mapping is texture mapping. In texture mapping, the first and second images are considered as so-called textures. CPU 16 and/or GPU 18 may divide the textures (e.g., circular images) into a plurality of texture primitives. As one example, CPU 16 and/or GPU 18 may define groups of three pixels as forming vertices of a triangular primitive, and may define primitives as a set of strip of primitives or fan of primitives, where an adjacent primitive shares two vertices from its neighboring primitive. A strip of primitives refers to two right-angle triangles connected together to form a rectangle, and a plurality of these rectangles forms a strip. A fan of primitives refers to a plurality of triangles each sharing a common vertex so that the triangles appear like a hand-fan. Primitives other than triangle primitives are possible. The size and shape of the primitives may be based on the implementation, but generally follows the operations of CPU 16 and/or GPU 18 forming primitives in the textures by defining vertices for the primitives from the pixels in the image content of the texture.

GPU 18 may then map a texture primitive onto a two-dimensional or three-dimensional mesh, and in this example, a two-dimensional rectangular mesh. For instance, a texture hardware unit of GPU 18 may stretch or otherwise modify image content from the textures, and effectively place the modified image content onto the rectangular mesh. As one example, GPU 18 may map each vertex of a texture primitive to respective points on the rectangular mesh, and may then render the rectangular mesh to generate a rectangular image (or so-called equirectangular image in 360-degree image or video content rendering).

Accordingly, to perform the texture mapping, GPU 18 may utilize a table that indicates mapping of a vertex of a texture primitive (e.g., a vertex of a primitive in a circular image after the circular image is divided into a plurality of primitives) to points on a rectangular mesh. In example techniques described in this disclosure, CPU 16 and/or GPU 18 may utilize, at least in part, the three-dimensional coordinates of the image content in the non-overlapping portion of the first and second circular images, and the three-dimensional coordinates of the image content in the set of overlapping bands to generate the table that indicates mapping of the vertex of the texture primitive to points on the rectangular mesh.

In addition, for stabilization and rolling shutter correction, CPU 16 and/or GPU 18 may receive information indicative of deviation from a common reference (e.g., movement of the device 10 such as rotation or change in orientation from common reference), and utilize this information to generate the table that indicates mapping of the vertex of the texture primitive to a point on the rectangular mesh. For example, as described above, one or more IMUs 33 may generate information that indicates changes in the orientation of device 10 relative to a common reference. An example of the common reference may be that lenses 12A and 12B are parallel to the ground, and the bottom of device 10 is towards the ground (as indicated by the gyroscope) (e.g., the example illustrated in FIG. 1). As another example, CPU 16 and/or GPU 18 may also receive information indicative of the delay in image capture on a per-line basis.

In this disclosure, deviation from a common reference is used to encompass examples of movement of device 10. Deviation from a common reference is also used to define examples where there is delay in image capture on a per-line basis. For instance, if each line captured image content at the same time, there would be a common reference for when image content is captured. However, due to delay in image capture, there is a deviation from the common reference because each line is capturing image content at a slightly different time. Deviation from a common reference includes one or both of the movement of device 10 during image capture and per-line delay of image capture.

As an example, for a first line of the first circular image, CPU 16 and/or GPU 18 may receive the following information: R(t+d), (x, y, z) coordinates for each of the pixels of the non-overlapping portion of the first circular image for the first line, and (x, y, z) coordinates for each of the pixels in one overlapping band of the set of overlapping bands in the first line. The variable R(t+d) indicates the deviation from a common reference for the first line, where d indicates that the first line is the line being processed and t is time. The (x, y, z) coordinates for each of the pixels in the non-overlapping portion correspond to pixels in the non-overlapping portion of the first line of the first image, and the (x, y, z) coordinates for each of the pixels in the overlapping portion correspond to pixels in the overlapping portion of the first line of the first image.

As an example, R(t+d) includes information of how much device 10 moved from the common reference (e.g., change in orientation from common reference), and includes information of the delay in capturing of the first line (e.g., row or column based on whether the sensors are samples horizontally or vertically). The movement of device 10 may be used to stabilize device 10 (e.g., address movement of device 10), and the delay may be used to address the shutter delay in the sampling of the sensors of lens 12A. Although the example is described with respect to deviation from the common reference including both movement of device 10 and shutter delay in device 10, the techniques are not so limited. In some examples, CPU 16 and/or GPU 18 may receive information indicative of the movement of device 10 (e.g., from one or more IMUs 33) and separately receive information indicative of the shutter delay.

CPU 16 and/or GPU 18 may utilize these variables (e.g., (x, y, z) coordinates for overlapping and non-overlapping portions of a first line and deviation from a common reference for the first line (R(t+d)), and determine a two-dimensional coordinate on the rectangular mesh. This two-dimensional coordinate on the rectangular mesh corresponds to a pixel in the first circular image. As part of the texture mapping, GPU 18 may map the color values of the pixel in the first circular image to the two-dimensional coordinate on the rectangular mesh. However, as described in more detail below, in some cases to avoid the creation of holes in the image content, CPU 16 and/or GPU 18 may modify the coordinates of where to map prior to the texture mapping.

CPU 16 and/or GPU 18 may repeat these operations for the next line in the first circular image. In this example, the information indicative of deviation from a common reference is R(t+2d) to indicate that the information indicative of deviation from the common reference is for the second line. The function R(t+2d) indicates the movement of device 10 and the shutter delay for the second line. The details of how CPU 16 and/or GPU 18 use information indicative of deviation from a common reference and the three-dimensional coordinates on the sphere to determine two-dimensional coordinates in the rectangular mesh is described in detail with respect to FIG. 15.

In the above example, CPU 16 and/or GPU 18 are described as determining a point on the rectangular mesh for each pixel in the first circular image. However, in some examples, CPU 16 and/or GPU 18 may determine a point on the rectangular mesh for each vertex of primitives in the first circular image. For example, if a vertex of a primitive falls on the line of pixels for which CPU 16 and/or GPU 18 are determining coordinates on the rectangular mesh, then CPU 16 and/or GPU 18 may determine coordinates on the rectangular mesh. For pixels that are not vertices of primitives (e.g., pixels within the primitives), CPU 16 and/or GPU 18 may not determine coordinates on the rectangular mesh.

CPU 16 and/or GPU 18 may repeat these operations for the first circular image to generate a table indicating the mapping between pixels in the first circular image and a point on a rectangular mesh. CPU 16 and/or GPU 18 may repeat similar operations for the second circular image. However, determination of the set of overlapping bands may not be needed. In some examples, determination of the set of overlapping bands may be needed where CPU 16 and/or GPU 18 did not determine the set of overlapping bands for the first circular image, or where CPU 16 and/or GPU 18 determine the set of overlapping bands by modifying image content in the overlapping portions of both the first and second circular images.

Figure 7:
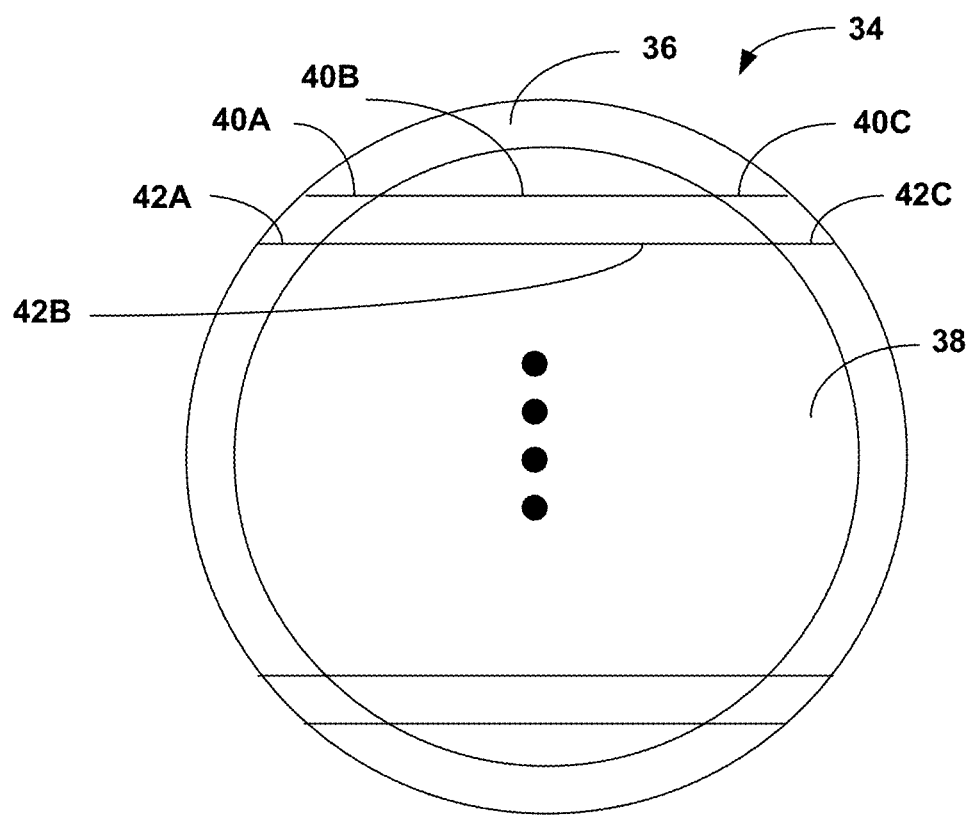
FIG. 7 is a functional diagram illustrating bands in an overlapping portion of a circular image.

FIG. 7 is a functional diagram illustrating bands in an overlapping portion of a circular image. For example, FIG. 7 illustrates circular image 34, which may be an example of the circular image of FIG. 2A or 2B. Image 34 includes overlapping portion 36 and non-overlapping portion 38. As illustrated, overlapping portion 36 is along a circumference of image 34.

Image 34 may be divided into a plurality of lines. For instance, lines 40A, 40C, 42A, and 42C are within the overlapping portion 36, and lines 40B and 42B are within non-overlapping portion 38. In the example techniques described in this disclosure, lines 40A, 40C, 42A, and 42C are examples of bands in overlapping portion 36 that CPU 16 and/or GPU 18 adjust (e.g., stretch or otherwise modify) to generate the set of overlapping bands.

CPU 16 and/or GPU 18 may convert the coordinates of the set of overlapping bands to three-dimensional coordinates, and may convert the coordinates of pixels in lines 40B and 42B to three-dimensional coordinates. CPU 16 and/or GPU 18 may then use these three-dimensional coordinates, and information indicative of deviation from a common reference (e.g., movement of device 10 and rolling shutter delay in the capture of each of the lines of image content) to determine where pixels in image 34 are to be mapped onto a rectangular mesh to generate an equirectangular image. As described in more detail below, there may be further modification of where pixels are mapped onto the rectangular mesh based on ensuring that holes are not created.

Figure 8:
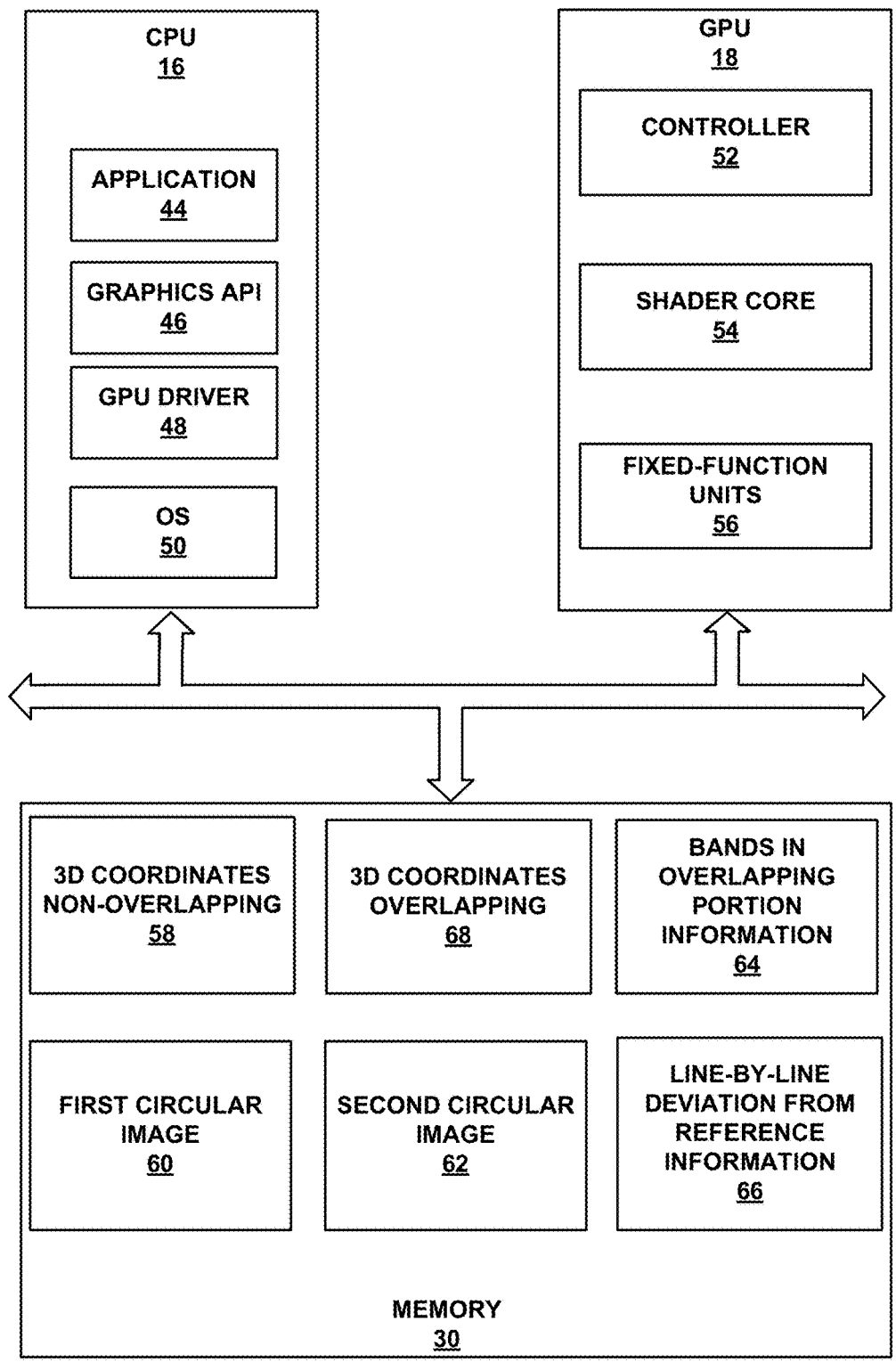
FIG. 8 is a block diagram illustrating a CPU, a GPU and a memory of the computing device of FIG. 6 in further detail.
Figure 9:
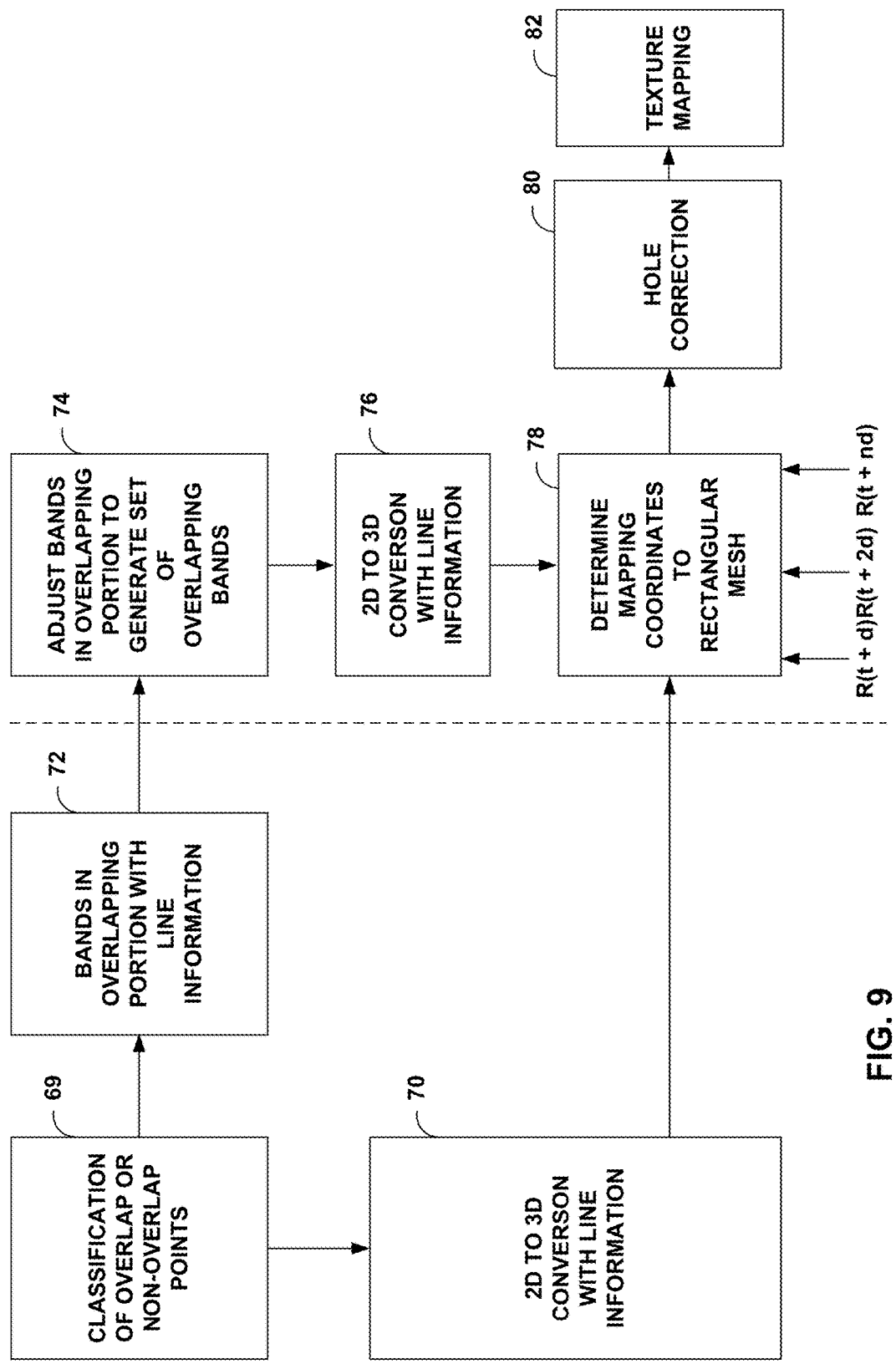
FIG. 9 is a flowchart illustrating an example operation according to one or more example techniques described in this disclosure.

FIG. 8 is a block diagram illustrating a CPU, a GPU and a memory of the computing device of FIG. 6 in further detail. FIG. 9 is a flowchart illustrating an example operation according to one or more example techniques described in this disclosure. For ease of description, FIGS. 8 and 9 are described together. Also, for additional context, reference is made to FIG. 7 in the description of FIGS. 8 and 9.

As shown in FIG. 8, CPU 16 is communicatively coupled to GPU 18 and memory 30, and GPU 18 is communicatively coupled to CPU 16 and memory 30. GPU 18 may, in some examples, be integrated onto a motherboard with CPU 16. In additional examples, GPU 18 may be implemented on a graphics card that is installed in a port of a motherboard that includes CPU 16. In further examples, GPU 18 may be incorporated within a peripheral device that is configured to interoperate with CPU 16. In additional examples, GPU 18 may be located on the same microchip as CPU 16 forming a system on a chip (SoC).

CPU 16 is configured to execute application 44, a graphics API 46, a GPU driver 48, and an operating system (OS) 50. GPU 18 includes a controller 52, shader core 54, and one or more fixed-function units 56.

Software application 44 may include at least some of one or more instructions that cause graphic content to be displayed or one or more instructions that cause a non-graphics task (e.g., a general-purpose computing task) to be performed on GPU 18. As an example, software application 44 may cause CPU 16 to cause camera processor 14 and lenses 12A and 12B to capture 360-degree video or images, and cause GPU 18 to render the 360-degree video or images for display. Software application 44 may issue instructions to graphics API 46. Graphics API 46 may be a runtime service that translates the instructions received from software application 44 into a format that is consumable by GPU driver 48. In some examples, graphics API 46 and GPU driver 48 may be part of the same software service.

GPU driver 48 receives the instructions from software application 44, via graphics API 46, and controls the operation of GPU 18 to service the instructions. For example, GPU driver 48 may formulate one or more command streams, place the command streams into memory 30, and instruct GPU 18 to execute command streams. GPU driver 48 may place the command streams into memory 30 and communicate with GPU 18 via operating system 50 (e.g., via one or more system calls).

Controller 52 of GPU 18 is configured to retrieve the commands stored in the command streams, and dispatch the commands for execution on shader core 54 and one or more fixed-function units 56. Controller 52 may dispatch commands from a command stream for execution on one or more fixed-function units 56 or a subset of shader core 54 and one or more fixed-function units 56. Controller 52 may be hardware, fixed-function circuitry of GPU 18, may be programmable circuitry of GPU 18 for executing software or firmware, or a combination of both.

Shader core 54 includes programmable circuitry (e.g., processing cores on which software executes). One or more fixed-function units 56 include fixed function circuitry configured to perform limited operations with minimal functional flexibility. Shader core 54 and one or more fixed-function units 56 together form a graphics pipeline configured to perform graphics processing.

Shader core 54 may be configured to execute one or more shader programs that are downloaded onto GPU 18 from CPU 16. A shader program, in some examples, may be a compiled version of a program written in a high-level shading language (e.g., an OpenGL Shading Language (GLSL), a High Level Shading Language (HLSL), a C for Graphics (Cg) shading language, etc.). In some examples, shader core 54 may include a plurality of processing units that are configured to operate in parallel (e.g., a SIMD pipeline). Shader core 54 may have a program memory that stores shader program instructions and an execution state register (e.g., a program counter register) that indicates the current instruction in the program memory being executed or the next instruction to be fetched. Examples of shader programs that execute on shader core 54 include, for example, vertex shaders, pixel shaders (also referred to as fragment shaders), geometry shaders, hull shaders, domain shaders, compute shaders, and/or unified shaders.

Fixed-function units 56 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 56 may include, for example, processing units that perform raster operations (e.g., depth testing, scissors testing, alpha blending, etc.).

GPU driver 48 of CPU 16 may be configured to write the command streams to memory 30, and controller 52 of GPU 18 may be configured to read the one or more commands of command streams from memory 30. In some examples, one or both of command streams may be stored as a ring buffer in memory 30. A ring buffer may be a buffer with a circular addressing scheme where CPU 16 and GPU 18 maintain synchronized state variables associated with the writing of data to and reading of data from the ring buffer. For example, if the first command stream is a ring buffer, each of CPU 16 and GPU 18 may store a write pointer indicating the next address to be written to in the ring buffer, and a read pointer indicating the next address to be read from in the ring buffer.

When CPU 16 writes a new command to the ring buffer, CPU 16 may update the write pointer in CPU 16 and instruct GPU 18 to update the write pointer in GPU 18. Similarly, when GPU 18 reads a new command from the ring buffer, GPU 18 may update the read pointer in GPU 18 and instruct CPU 16 to update the read pointer in CPU 16. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 48 and an example GPU controller 52 is now described with respect to FIG. 8. GPU driver 48 receives one or more instructions from software application 44 that specify graphics operations and/or general-purpose computing operations to be performed by GPU 18. GPU driver 48 places the output command stream into memory 30, which is accessible by GPU controller 52. GPU driver 48 notifies GPU controller 52 that the command stream corresponding to software application 44 is available for processing. For example, GPU driver 48 may write to a GPU register (e.g., a GPU hardware register polled by GPU 18 and/or a GPU memory-mapped register polled by GPU 18) one or more values indicating that the command stream is ready for execution.

Upon notification that the command stream is ready for execution, controller 52 of GPU 18 may determine if resources are currently available on GPU 18 to begin executing the command stream. If resources are available, controller 52 begins to dispatch the commands in the command stream.

As part of graphics processing, CPU 16 may offload certain graphics processing tasks to GPU 18. For instance, application 44 may generate attribute data for attributes of a plurality of vertices of primitives that interconnect to form a graphical object. Application 44 may store the attribute data in a vertex buffer in memory 30 (e.g., as vertices in the circular images such as those of FIGS. 2A and 2B). GPU driver 48 may instruct controller 52 to retrieve the attribute data for the attributes of the vertices for processing to generate graphics data for display.

As an example operation, application 44 may cause lenses 12A and 12B to capture image content, and cause camera processor 14 to generate and store first circular image 60 and second circular image 62 in memory 30. Application 44, via graphics API 46 and GPU driver 48, may generate a command stream instructing GPU 18 to perform the example techniques described in this disclosure.

Referring to FIG. 9, the left side of the dashed line may be information that is generated during manufacturing or testing, or generally performed before device 10 executes application 44. However, such information may be generated as part of the execution of application 44. The right side of the dashed line illustrates example operations that CPU 16 and/or GPU 18 may perform during runtime (e.g., as part of the execution of application 44).

As described above, during manufacturing, a tester may classify locations of pixels in the circular images as being in an overlap portion or non-overlap portion (69). For example, for pixels that would fall within overlapping portion 36 of FIG. 7, the tester may indicate the line number of these pixels (e.g., the line to which the pixels belong) and that they are in overlapping portion 36. Similarly, for pixels that would fall within non-overlapping portion 38 of FIG. 7, the tester may indicate the line number of these pixels and that they are in non-overlapping portion 38. The tester may store such information in memory 30 in some examples, but such storage is not necessary.

Based on the classification of whether pixels are in the overlapping portion or the non-overlapping portion, as illustrated in FIG. 9, the tester may convert the two-dimensional coordinates of the pixels that reside in the non-overlapping portion 38, illustrated in FIG. 7, to 3D coordinates (70). In some examples, 3D coordinates non-overlapping 58, in memory 30, may store the three-dimensional coordinates of the pixels that reside in the non-overlapping portion 38. Again, the three-dimensional coordinates represent where a pixel in the circular image 34 would be located in the sub-capsule.

For instance, the first circular image (e.g., FIG. 2A) is a two-dimensional image that is mapped to a first sub-capsule that is three-dimensional, and the second circular image (e.g., FIG. 2B) is a two-dimensional image that is mapped to a second sub-capsule that is three-dimensional. The image content in the first and second sub-capsules together forms the image content of the sphere of image content for 360-degree images or video. Accordingly, 3D coordinates non-overlapping 58 may store information indicating the line (e.g., row or column) on which a pixel in non-overlapping portion 38 of circular image 34 resides, and the location, in three-dimensional coordinates, of where the pixel would be located in its sub-capsule. 3D coordinates non-overlapping 58 may store such information for both the first and second circular images (e.g., such information for both FIG. 2A and FIG. 2B).

As also illustrated in FIG. 9, the tester may generate information of bands in overlapping portion 36 with line information (72). For instance, the tester may generate information that indicates that line 40A and 40C belong to a common band in overlapping portion 36 and are a first line in overlapping portion 36. The tester may generate information that indicates that line 42A and 42C belong to a common band in overlapping portion 36 and are a second line in overlapping portion 36, and so forth. It should be understood that in this example that the term "first line" and "second line" is used to differentiate the positions of lines 40A, 40C from lines 42A, 42C. As illustrated in FIG. 8, bands in overlapping portion information 64 may store the information indicating which are the bands in overlapping portion 36 and the lines to which they belong.

With the information generated during manufacturing, CPU 16 and/or GPU 18 may utilize the information to generate images that account for the rolling shutter delay of lenses 12A and 12B and movement of device 10. For example, as illustrated in FIG. 9, CPU 16 and/or GPU 18 may adjust bands in overlapping portion to generate a set of overlapping bands (74). To perform such operations, as one example, graphics API 46 may generate instructions that GPU driver 48 outputs to controller 52 indicating the storage location of bands in overlapping portion information 64. In response, controller 52 retrieves bands in overlapping portion information 64, and extracts the bands from first circular image 60 and second circular image 62 based on information 64.

GPU 18 may then adjust the bands in at least one of first circular image 60 or second circular image 62 until the image content overlaps. For example, where a pixel in a particular location after adjustment of first circular image 60 is the same color as a pixel in the same location of second circular image 62, or vice-versa. In some examples, GPU 18 may adjust bands in first circular image 60 and second circular image 62 until there is overlap.

GPU 18 may perform such operations with a shader program, such as a vertex shader as one example, executing on shader core 54. For example, the shader program may modify the u and/or v coordinates of pixels in bands in first circular image 60, and compare the pixel color value of the pixels to pixels in second circular image 62 that have the same coordinates as the modified coordinates. Based on the comparison (e.g., such as the difference), the shader program may determine whether further adjustment is needed (e.g., if the difference is greater than a threshold) or whether no further adjustment is necessary. When no further adjustment is necessary, shader core 54 may have determined an overlapping band. Shader core 54 may repeat these operations for the other bands of first circular image 60. In this way, shader core 54 may generate a set of overlapping bands.

After adjustment, CPU 16 and/or GPU 18 may convert the adjusted two-dimensional coordinates to three-dimensional coordinates (76). As described above, this conversion may be based on where the pixels having the adjusted coordinates would be located on the sub-capsule. CPU 16 and/or GPU 18 may store the resulting three-dimensional coordinates in 3D coordinates overlapping 68 of memory 30 or local memory of CPU 16 and/or GPU 18.

CPU 16 and/or GPU 18 may determine mapping of coordinates to a rectangular mesh based on three-dimensional coordinates of the non-overlapping portion 38, three-dimensional coordinates of the pixels in the set of overlapping bands, and information indicative of deviation from a common reference (78). For example, controller 52 may execute a shader program on shader core 54. In response, shader core 54 may retrieve 3D coordinates non-overlapping 58, three-dimensional coordinates for the pixels in the set of overlapping bands from 3D coordinates overlapping 68, and per-line (e.g., line-by-line) deviation from reference information 66 from memory 30.

Line-by-line deviation from reference information 66 includes information captured by IMUs 33 that indicate movement of device 10. Additionally, line-by-line deviation from reference information 66 includes information of the camera shutter delay of each of the lines of sensors of lenses 12A and 12B. For instance, as illustrated in FIG. 9, R(t+d) includes information of movement of device 10 and shutter delay of a first line, R(t+2d) includes information of movement of device 10 and shutter delay of a second line, and so forth to R(t+nd). Such information of movement of device 10 and shutter delay may be stored in line-by-line deviation from reference information 66.

Although line-by-line deviation from reference information 66 is described as including the combined information of the movement of device 10 and the shutter delay of a line, the techniques are not so limited. In some examples, memory 30 may store information about the movement of device 10 and separately store information about the shutter delay. In such examples, shader core 54 may separately compensate for the movement and shutter delay.

Shader core 54 may retrieve the determined three-dimensional coordinates for the pixels that are in a line of pixels of circular image 34. For example, in circular image 34, each pixel is defined by a two-dimensional coordinate. 3D coordinates non-overlapping 58 stores information indicating to which row that pixel belongs and its three-dimensional coordinates on the sub-capsule. Similarly, bands in overlapping portion information 64 stores information indicating to which row that pixel belongs and its three-dimensional coordinates on the sub-capsule. Based on the row to which a pixel belongs, shader core 54 may determine which one of R(t+xd), from line-by-line deviation from reference information 66, to apply where x ranges from 1 to n, and n equals the number of lines in circular image 34.

Based on which R(t+xd) to apply, shader core 54 may determine a coordinate on a rectangular mesh to which the pixel on circular image 34 should be mapped. For instance, shader core 54, in this example for determining mapping coordinates to rectangular mesh (78), may perform its operations to generate a table for where pixels in circular image 34 are to be mapped onto a rectangular mesh.

As an example, each of the pixels in circular image 34 may be defined by an (x, y) coordinate. To avoid confusion, rather than using (x, y), assume that pixels in circular image 34 are defined by a (u, v) coordinate, where the variable u is used as a substitute for x, an v is used as a substitute for y. Points on a rectangular mesh may be defined by an (x, y) coordinate. Shader core 54 may determine a mapping between (u, v) coordinates of pixels in circular image 34 and (x, y) coordinates on the rectangular mesh.

One example algorithm to determine (x, y) coordinates on the rectangular mesh based on (u, v) coordinates in the circular image, three-dimensional coordinates for the pixels on the sub-capsule, and deviation from the common reference (e.g., R(t+xd) is described in more detail with respect to FIGS. 14A-14C and FIG. 15. In general, CPU 16 and/or GPU 18 may determine three-dimensional coordinates ($x_{sphere}$, $y_{sphere}$, $z_{sphere}$) of points in the circular images to points on a sphere, as described in more detail with respect to FIGS. 14A-14C. CPU 16 and/or GPU 18 may determine corrected three-dimensional coordinates based on the pitch, roll, yaw values. For example, CPU 16 and/or GPU 18 may generate a rotation matrix based on the pitch, roll, and yaw, and multiply the three-dimensional coordinates ($x_{sphere}$, $y_{sphere}$, $z_{sphere}$) by the rotation matrix to generate corrected coordinates ($x_{Csphere}$, $y_{Csphere}$, $z_{Csphere}$). CPU 16 and/or GPU 18 may then convert the corrected coordinates ($x_{Csphere}$, $y_{Csphere}$, $z_{Csphere}$) to two-dimensional coordinates. Example operations for performing such conversion is described in more detail with respect to FIG. 15.

For the set of overlapping bands that were generated from adjusting coordinates of pixels in overlapping portion 36 of first circular image 60, shader core 54 may determine the (x, y) coordinates in the rectangular mesh based on the original (x, y) coordinates for these pixels in first circular image 60. For instance, although shader core 54 determined the (x, y) coordinates based on the adjusted coordinates to generate the set of overlapping bands, for texture mapping, the (u, v) coordinates may be those prior to adjustment but the (x, y) coordinates will indicate where that pixel is to be mapped to ensure that there is overlap in the equirectangular image.

In the above example, shader core 54 is described as performing the example operations on each pixel in first circular image 60. However, in some examples, shader core 54 may perform such operations only on vertices of primitives in first circular image 60. For example, as part of classifying pixels as overlapping or non-overlapping, CPU 16 (e.g., via execution of application 44) may divide the first circular image 60 into a plurality of primitives, and define vertices for the primitives based on their (u, v) coordinates. There may be other times when CPU 16 divides the first circular image 60 into primitives other than as part of the classification. Shader core 54 may perform the example operations on the vertices of the primitives. Although the examples are described with first circular image 60, similar operations may be performed with respect to second circular image 62, or on both first circular image 60 and second circular image 62.

After shader core 54 determines the mapping of three-dimensional coordinates to two-dimensional coordinates, in one example, a hardware texture unit of fixed-function unit 56 may perform texture mapping operations (82) (e.g., hole correction (80) may be bypassed in some examples). For example, the hardware texture unit may retrieve the image content for a pixel from first circular image 60, and map the color of that pixel to the determined coordinate on the rectangular mesh. The hardware texture unit may repeat this operation for all pixels to generate a first equirectangular image.

In examples where shader core 54 generates mapping coordinate for the vertices instead of all pixels, the hardware texture unit may map the vertices to the rectangular mesh and then modify (e.g., stretch, bend, warp, etc.) the image content captured by the primitive formed by the vertices in first circular image 60 and overlay that image content in the primitive in the rectangular mesh formed by the mapped vertices in the rectangular mesh. For instance, assume a rectangular primitive in first circular image 60 includes vertices (1, 1), (1, 2), (2, 1), and (2, 2), and that these vertices map to (3, 3), (7, 3), (3, 7), and (7, 7). In this example, the rectangle primitive on the rectangular mesh to where the rectangular primitive in first circular image 60 is being mapped is 16 times the size. Accordingly, the hardware texture unit may stretch out the primitive by a factor of 16

(e.g., by a factor of four horizontally and a factor of four vertically) so as to overlay the 1×1 primitive (e.g., (1, 1), (1, 2), (2, 1), and (2,2) forms a 1×1 primitive) in first circular image 60 onto the 4×4 primitive (e.g., (3, 3), (7, 3), (3, 7), and (7, 7) forms a 4×4 primitive) in the rectangular mesh.

In this way, the texture hardware unit may generate a first equirectangular image. Shader core 54 may perform similar operations with respect to image content stored for second circular image 62 to generate a second equirectangular image. However, in some examples, shader core 54 may not need to perform the operations of adjusting bands in overlapping portion to generate the set of overlapping bands (74) or the 2D to 3D conversion (76) because such operations may only need to be done for one of the two images.

GPU 18 may blend (e.g., via a blender circuit of fixed-function units 56) the two equirectangular images to generate a final equirectangular image. GPU 18 may then texture map (e.g., via the hardware texture unit) this final equirectangular image onto a spherical mesh to generate the final image content that GPU 18 renders for display.

Figure 10A:
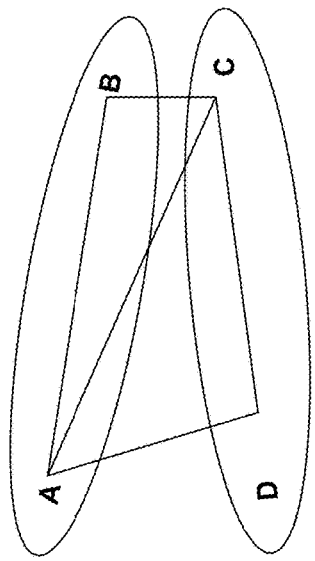
FIGS. 10A and 10B are conceptual diagrams illustrating examples of shifting of image content due to rolling shutter correction.
Figure 10B:
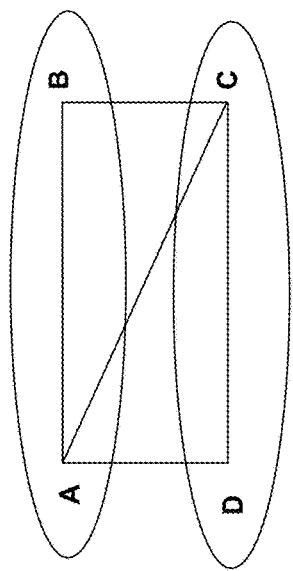

FIGS. 10A and 10B are conceptual diagrams illustrating examples of shifting of image content due to rolling shutter correction. FIG. 10A illustrates positions of vertices A, B, C, and D in an image captured by lens 12A or 12B. In cases where there is no rolling shutter and only rotation relative to the common reference, then for stabilization, GPU 18 may map points on the captured image (e.g., A, B, C, and D) to points on the rectangular mesh based on an inverse rotation relative to the common reference to stabilize the image and remove wobble. This stabilization may be applied uniformly (e.g., same inverse rotation to A, B, C, and D even though A and B are in a different line than D and C).

However, when rolling shutter is included, each line of pixels may have different movement relative to the common reference. In other words, pixels in different lines may not be uniformly rotated relative to the common reference. Accordingly, addressing rolling shutter delay or a combination of rolling shutter delay and movement of device 10 may be a warp operation rather than a pure rotation. For instance, the operations described above of determining mapping coordinates to the rectangular mesh (78) may be considered as an example of warping the image, rather than mere rotation of the image because the image is stretched or otherwise modified as part of mapping pixels in the images captured by lens 12A or 12B to the rectangular mesh.

As described above, GPU 18 (e.g., the hardware texture unit) may receive a list of vertices (e.g., A, B, C, and D) in FIG. 10A and information for where the vertices need to be mapped in the rectangular mesh. FIG. 10B illustrates an example of where vertices A, B, C, and D are mapped in the rectangular mesh.

In FIGS. 10A and 10B, R(t) represents the movement of device 10 from a common reference, and as illustrated in FIGS. 10A and 10B, vertex A may remain in same spot, but vertex B becomes shifted. R(t+Δ) represents the combination of movement of device 10 from a common reference and rolling shutter delay for the line that includes vertices D and C. As illustrated in FIGS. 10A and 10B, vertices D and C may shift different than vertices A and B because of the rolling shutter delay.

As illustrated in FIG. 10A, vertices A, B, C, and D may form a rectangle, but vertices A, B, C, and D may not form a rectangle in the rectangular mesh. In this example, as part of the texture mapping, the hardware texture unit may overlay by stretching/compressing the image content encompassed by vertices A, B, C, and D in FIG. 10A so that the image content overlays in the area encompassed by vertices A, B, C, and D in FIG. 10B. The hardware texture unit may be configured to perform such operations with parallel processing enabling efficient and low-latency implementation.

However, in some examples, CPU 16 and/or GPU 18 may first determine whether any "holes" would be created as part of mapping of the image content from first circular image 60 and second circular image 62 to their respective rectangular meshes. If such holes would be created, CPU 16 and/or GPU 18 may perform hole correction operations (80).

Figure 11A:
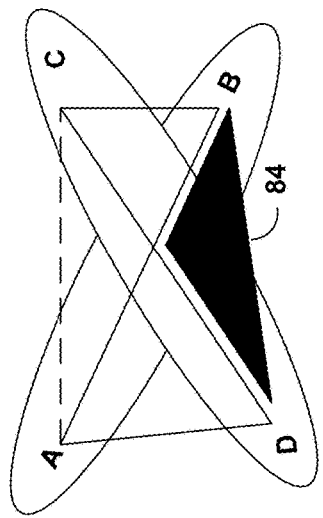
FIGS. 11A and 11B are conceptual diagrams illustrating examples of shifting of image content due to rolling shutter correction and a resulting hole in the image content.
Figure 11B:
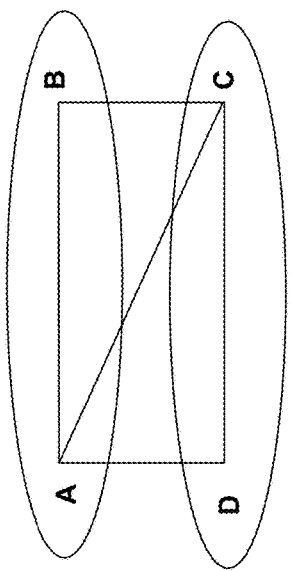

FIGS. 11A and 11B are conceptual diagrams illustrating examples of shifting of image content due to rolling shutter correction and a resulting hole in the image content. For instance, FIG. 11A is identical to FIG. 10A. In some cases, two rotated set of points from two lines may actually cross one another. This may lead to holes (e.g. hole 84) after the hardware texture unit performs texture mapping. Hole 84, in FIG. 11B, illustrates a portion for which there is no image content resulting in a blank space in the image.

For example, due to the movement and rolling shutter delay (e.g., R(t) and R(t+Δ) illustrated in FIGS. 11A and 11B), the coordinates for vertices B and C may be such that vertex C is above vertex B in the rectangular mesh. In this example, the hardware texture unit may not be able to stretch, compress, warp, or otherwise modify the image content captured by vertices A, B, C, and D in FIG. 11A so that it can overlay in the area encompassed by vertices A, B, C, and D in FIG. 11B because of the shifting of the order of vertices B and C.

In the example techniques described in this disclosure, CPU 16 and/or GPU 18 may determine the presence of a hole, such as hole 84, and perform additional adjustment of coordinates to avoid the presence of the hole. For example, in FIG. 11B, the order of vertices B and C were flipped from FIG. 11A. One example of hole detection may be based on CPU 16 and/or GPU 18 detecting such a flip, or more generally, detecting a "u-turn" in the mapping of pixels (e.g., one pixel that is to be below another pixel is instead next to or above the pixel, or one pixel that is be next to another pixel is instead above or below the pixel).

For example, a row of pixels in circular image 34 includes the same v-coordinate (which is a substitute of the y-coordinate), but different u-coordinate (which is a substitute of the x-coordinate). If after mapping (e.g., warping/rotation), the order of the x-coordinates is not preserved on the rectangular mesh (e.g., rather than being next to the previous pixel, it is above or below), then there may be flipping of the order of vertices. The same may be true for a column of pixels where rather than a vertex being below another vertex, it becomes next to the vertex.

Figure 12A:
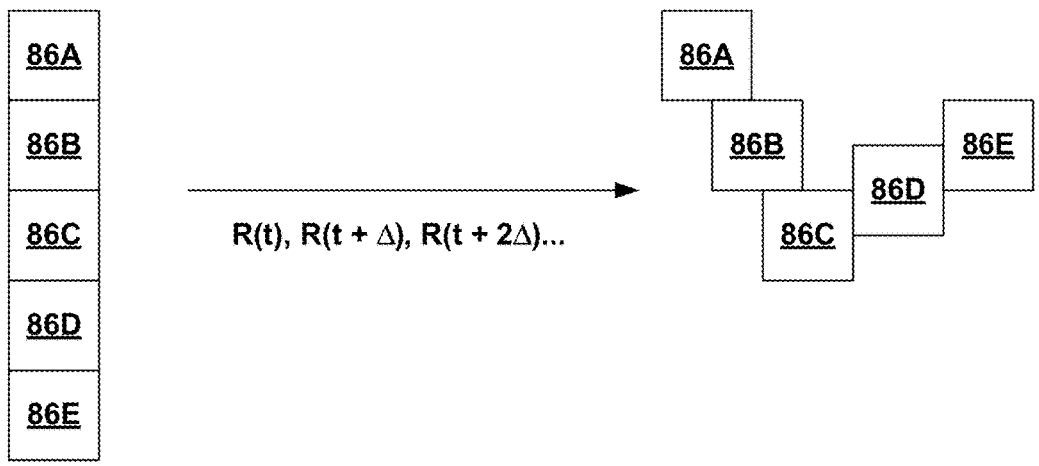
FIG. 12A is a conceptual diagram illustrating an example of shifting of pixels due to rolling shutter correction that can cause a hole in the image content.

FIG. 12A is a conceptual diagram illustrating an example of shifting of pixels due to rolling shutter correction that can cause a hole in the image content. For example, in FIG. 12A, pixels 86A-86E are located in an image captured by lens 12A or 12B. After shader coder 54 determines where the pixels are to be mapped on the rectangular mesh based on the deviation from the common reference (e.g., R(t+xΔ)), shader core 54 may determine that pixel 86D is higher than pixel 86C, and pixel 86E is higher than pixel 86D based on their respective y-coordinates, as illustrated on the right side of FIG. 12A. For instance, rather than pixel 86D being lower than pixel 86C, pixel 86D bends the line forming a "u-turn." As illustrated, pixels 86B, 86C, and 86D conceptually appear like a "U," where the u-turn occurs where pixel 86D is higher than 86C. In this case, shader core 54 may determine that there is a likelihood of there being a hole in the image.

Figure 12B:
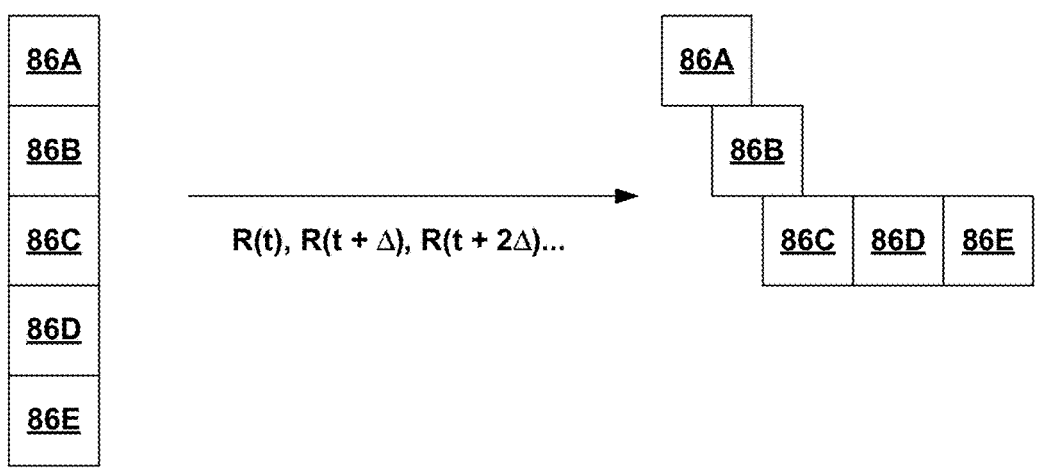
FIG. 12B is a conceptual diagram illustrating an example of clamping the shift of pixels due to rolling shutter correction to avoid causing a hole in the image content.

FIG. 12B is a conceptual diagram illustrating an example of clamping the shift of pixels due to rolling shutter correction to avoid causing a hole in the image content. Clamping refers to setting a maximum and/or minimum value. For example, clamping a pixel may set the maximum value of the x or y coordinate of that pixel such that if the x or y coordinate is greater than the maximum value, the x or y coordinate is clamped to be equal to the maximum value.

As an example, if shader core 54 determines that a pixel that is to be below another pixel ends up being above, then shader core 54 may clamp the coordinates of that pixel so that the pixel cannot be higher. In other words, when the order of vertices is violated, shader core 54 may clamp the amount of warping of the vertices either before or after the u-turn. For example, shader core 54 may compare y-coordinates of pixels that are to be in a row, and may clamp the y-coordinate of a pixel that is to be below a current pixel to the y-coordinate of the current pixel so that the y-coordinate of the pixel that is to be below cannot be less than the y-coordinate of the current pixel.

In some examples, shader core 54 may perform such clamping only when a hole is detected. Otherwise, there may not be any constraints on where a pixel may be mapped in the rectangular mesh. For example, the only constraint of where a pixel may be mapped in the rectangular mesh may be if a hole is created.

As another example for determining that a hole may be present in the equirectangular image is based on vector cross-products. For example, assume that edges of AD, AC, and AB in example FIGS. 10A, 10B, 11A, and 11B are vectors emanating from A. In this example, the cross-product AD×AC and AC×AB in FIGS. 10A and 11A are vectors along the same line and have the same sign (i.e., have same direction). The same cross-products in FIG. 11B are along the same line, but have the opposite sign of the cross-product from FIGS. 10A and 11A.

In some examples, a hole in the equirectangular image may be created if there is a sign change between cross-products of vectors that define triangles (as illustrated in FIGS. 10A, 10B, 11A, and 11B) that share a common edge. In some examples, shader core 54 may compare triangles in images captured by lenses 12A and 12B with its three neighboring triangles, after determining the location of the neighboring triangles on the rectangular mesh, to determine if holes will be created (e.g., based on the cross-products).

When a hole will be created, as determined from the cross-products, shader core 54 may determine new primitives. For example, in FIG. 11B, shader core 54 or CPU 16 may retriangulate so that quadrilateral ACBD is divided into non-overlapping triangles ACB and ADB. In this example, image content from the circular images captured by lenses 12A and 12B may be used to overlay in triangles ACB and ADB. In some examples, not all of the circular images may be overlaid onto the rectangular mesh to generate the equirectangular image, but there may not be holes in the output image.

Accordingly, in general, for hole detection and prevention, shader core 54 (or CPU 16) may determine that holes would be created in the equirectangular images based on an initial determination of the position of the coordinates. The initial determination of the position of the coordinates means the determination based on the mapping of pixels defined by (u, v) coordinates in the circular images to locations defined by (x, y) coordinates in the rectangular mesh. For pixels, which may be vertices in this example, that would create holes, shader core 54 or CPU 16 may perform additional operations to correct the holes. For vertices that do not create holes, no further adjustment to the coordinates of the vertices may be needed to address holes.

In one example, shader core 54 may clamp vertical or horizontal locations of vertices corresponding to the coordinates based on the determination that holes would be created. In this example, shader core 54 may determine the coordinates of where pixels from the circular images are to be mapped based on the clamped vertical or horizontal locations.

In another example, shader core 54 may redefine vertices (e.g., determine new primitives) corresponding to the coordinate based on the determination that holes would be created. In this example, shader core 54 may determine the coordinates of where pixels from the circular images are to be mapped based on the redefined vertices.

Figure 13:
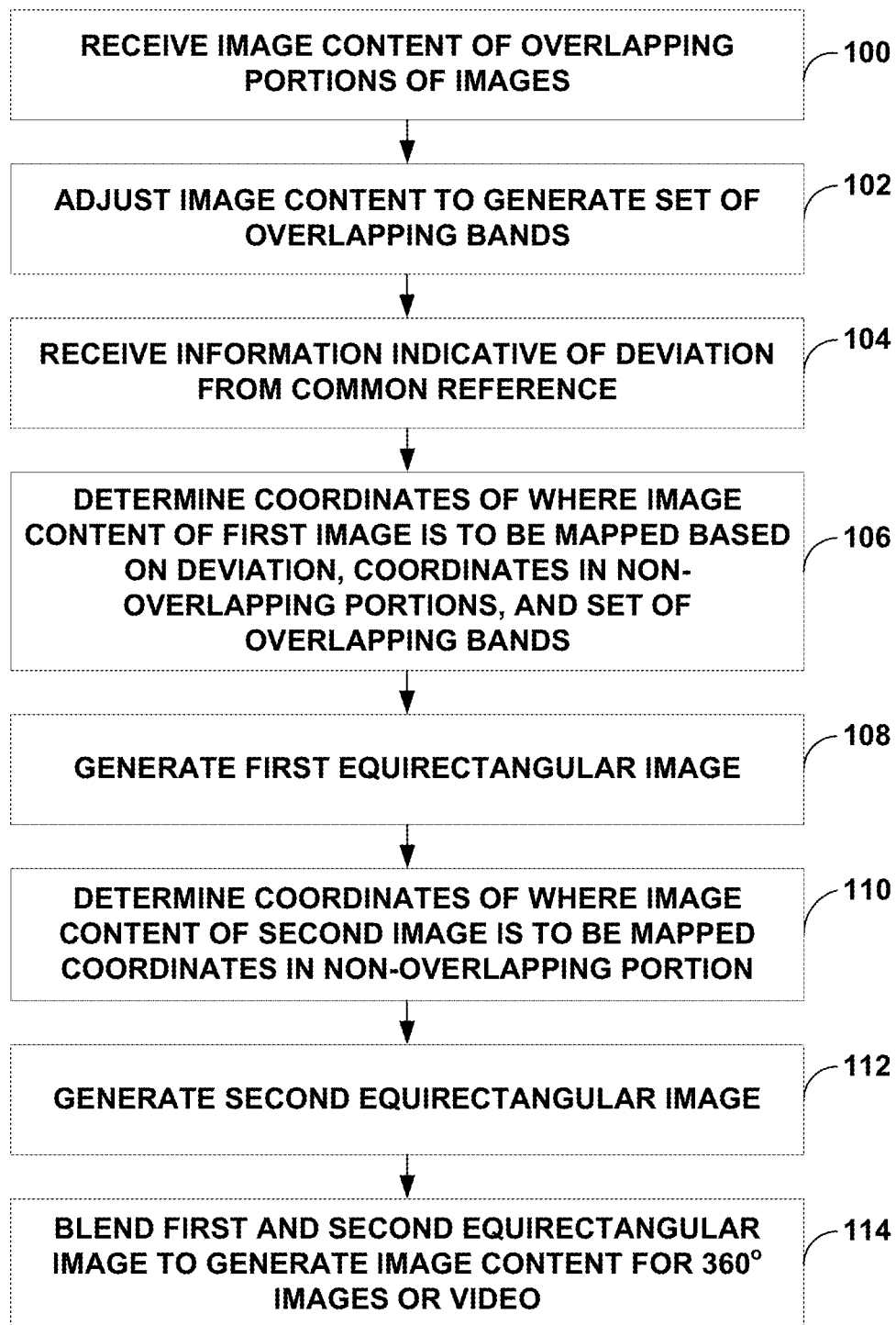
FIG. 13 is another flowchart illustrating another example method of operation according to one or more example techniques described in this disclosure.

FIG. 13 is another flowchart illustrating another example method of operation according to one or more example techniques described in this disclosure. For purposes of description, the examples are described with respect to one or more processing circuits, examples of which include CPU 16 and/or GPU 18, and information stored in memory 30.

For example, memory 30 may store first circular image 60 and second circular image 62, and bands in overlapping portion information 64. The one or more processing units may receive image content for a first set of bands of a first overlapping portion of first circular image 60 from overlapping portion information 64, and a second set of bands of a second overlapping portion of second circular image 62 from overlapping portion information 64 (100). As described above, the first circular image 60 includes the first overlapping portion (e.g., such as overlapping portion 36) and a first non-overlapping portion (e.g., such as non-overlapping portion 38). Similarly, the second circular image 62 includes the second overlapping portion, and a second non-overlapping portion.

The first overlapping portion includes a circular portion along the circumference of the first image having a same center point as the first image (e.g., as illustrated by overlapping portion 36 in FIG. 7), and the first set of bands includes a set of lines, each line including image content from a first side of the circular portion along the circumference of the first image, and a second side of the circular portion along the circumference of the first image (e.g., as illustrated with lines 40A, 40C, 42A, and 42C in FIG. 7). The second overlapping portion includes a circular portion along the circumference of the second image having a same center point as the second image (e.g., as illustrated by overlapping portion 36 in FIG. 7), and the second set of bands comprise a set of lines, each line including image content from a first side of the circular portion along the circumference of the second image, and a second side of the circular portion along the circumference of the first image (e.g., as illustrated with lines 40A, 40C, 42A, and 42C in FIG. 7).

The one or more processing circuits may adjust the image content in at least one of the first set of bands or second set of bands until the image content in the first set of bands overlaps with image content in the second set of bands to generate a set of overlapping bands (102). For example, the one or more processing circuits may add values to the u and/or v coordinates for the pixels located in the first overlapping portion and compare color values with pixels located at the same u and v coordinates in the second overlapping portion. If the difference between the two pixel values is less than a threshold, the one or more processing circuits may stop the adjustment. If the difference between the two pixel values is greater than a threshold, the one or more processing circuits may continue adjusting. As another example, the one or more processing circuits may minimize the sum of absolute differences to determine when to stop adjusting the image content.

In FIG. 13, the one or more processing circuits may receive information indicative of the deviation from a common reference (e.g., from line-by-line deviation from reference information 66 stored in memory 30) (104). In one example, the information indicative of deviation from the common reference is based at least in part on a rolling shutter delay of camera sensors (e.g., per-line rolling shutter delay) used for capturing image content of the first and second images. In another example, the information indicative of deviation from the common reference is based at least in part on a rolling shutter delay of camera sensors (e.g., per-line rolling shutter delay) used for capturing image content of the first and second images and movement of the camera sensors.

The one or more processing circuits may determine coordinates for where image content in the set of overlapping bands and the first non-overlapping portion is to be mapped on a rectangular mesh based on the received information indicative of the deviation from the common reference to compensate for at least one of device movement or rolling shutter delay during capture of the image content (106). For example, the one or more processing circuits may determine three-dimensional coordinates for image content in the set of overlapping bands based on two-dimensional coordinates of image content in the set of overlapping bands for storage in 3D coordinates overlapping 68, and receive (e.g., via 3D coordinates non-overlapping 58) three-dimensional coordinates for image content in the first non-overlapping portion. In this example, the one or more processing circuits may determine coordinates for where image content in the set of overlapping bands and the first non-overlapping portion is to be mapped on a rectangular mesh based on the received information indicative of the deviation from the common reference, the determined three-dimensional coordinates for image content in the set of overlapping bands, and the received three-dimensional coordinates for image content in the first non-overlapping portion.

During the capturing of the image content, there may be device movement and/or rolling shutter delay. By determining coordinates for where image content in the set of overlapping bands and the first non-overlapping portion is to be mapped on a rectangular mesh based on the received information indicative of the deviation from the common reference, the determined three-dimensional coordinates for image content in the set of overlapping bands, and the received three-dimensional coordinates for image content in the first non-overlapping portion, the one or more processing circuits may determine coordinates in the rectangular mesh that when image content is mapped to the determined coordinates compensates for at least one of the device movement or rolling shutter delay that occurred during capturing of the image content.

In some examples, the one or more processing circuits may determine that holes would be created in the equirectangular images based on an initial determination of the positions of coordinates (e.g., based on vertical or horizontal locations of the primitives or based on cross-products between edges of adjacent primitives). In one example, the one or more processing circuits may clamp vertical or horizontal locations of vertices corresponding to the coordinates based on the determination that holes would be created, and determine the coordinates based on the clamped vertical or horizontal locations. In one example, the one or more processing circuits may redefine vertices corresponding to the coordinates based on the determination that holes would be created, and determine the coordinates based on the redefined vertices.

The one or more processing circuits may generate a first equirectangular image (108). For example, with the locations of pixels in the first circular image and locations in the rectangular mesh where the pixels are to be mapped, the hardware texture unit may overlay primitives in the first circular image onto the rectangular mesh to generate the first equirectangular image.

For generating the second equirectangular image, the one or more processing circuits may determine coordinates for where image content in the second non-overlapping portion is to be mapped on a second rectangular mesh based on the received information indicative of the deviation from the common reference (110) using similar techniques as those described above for the first circular image but the one or more processing circuits may not need the adjusted coordinates for the set of overlapping bands. The one or more processing units may then generate a second equirectangular image based on the determined coordinates for where image content in the second non-overlapping portion is to be mapped on the second rectangular mesh to generate the second equirectangular image (112) using similar techniques as those described above for the first equirectangular image.

The one or more processing circuits may blend the first and second equirectangular images to generate image content for the 360-degree images or video (114). In this way, the one or more processing circuits may substantially reduce the wobble in the 360-degree image content caused by movement of camera device 10 and/or the rolling shutter delay of lenses 12A and 12B.

FIGS. 14A-14C are conceptual diagrams illustrating conversion of coordinates of a point on a circular image to coordinates on a sphere. For instance, FIG. 14A illustrates an example of lens 12A, but the example is applicable to lens 12B as well. FIGS. 14A and 14B illustrate how rays from a sphere around lens 12A illustrated in FIG. 14A map to the circular image illustrated in FIG. 14B. For example, FIG. 14A illustrates a side view of sensor plane 116, and FIG. 14B illustrates a front view of sensor plane 116.

In FIG. 14A, angle $\theta$ is the angle from optical axis of lens 12A, and represents an angle that hits lens 12A at location "x" of FIG. 14B. The angle $\theta$ determines distance r1 of the point "x" from the center of the circular image, as illustrated in FIG. 14B. For example, ray 120, illustrated by dashed lines, illustrates where an object with angle $\theta$ would reflect onto sensor plane 116, and would be located at point "x" illustrated in the front view of sensor plane 116. In FIG. 14A, ray 118, illustrated by dashed lines, is coming from the extremum (maximum or minimum of a function) of the field of view and maps to the circumference of the circular image illustrated in FIG. 14B. In FIG. 14B, like FIG. 3B, r1, max is the maximum size of a line segment (r1) from the center to the perimeter (e.g., the radius). Ray 118 defines the outer boundary such that image content captured by objects angled along ray 118 would appear along the circumference of the circular image illustrated in FIG. 14B. In FIG. 14B, the angle $\Phi$, in FIG. 14B, is the azimuth of the ray 118. For example, if a point of interest on ray 118 is projected perpendicularly onto a reference plane, the angle between the projected vector and a vector on the reference plane is called the azimuth.

FIG. 14C illustrates mapping of a point "x" on a circular image (e.g., such as that illustrated in FIG. 14B) to a sphere. In FIG. 14C, the point "x" in the circular image of FIG. 14B is described here in terms of two coordinates (r1 and the angle Φ). Using an x, y coordinate may be possible as well. Correspondingly, there are two coordinates (θ and Φ) that describe the same point on the unit sphere. The angle Φ is unchanged, and the angle θ is given by the equations r1=g(θ), where g( ) is a third order polynomial whose coefficients are determined during calibration (at the factory) or assumed to have ideal values for a specific fisheye model, such as equidistant. Since r1 is known, the root of the polynomial g( ) is obtained (e.g., by GPU 18 or CPU 16) to determine the angle θ. One example of g(θ) is $1.029553*\theta - 0.008787*\theta^3$.

Based on the angle θ and Φ, the x, y, z coordinates on the sphere are given by the following equations:

$x_{sphere} = \sin(\theta) * \cos(\Phi);$ $y_{sphere} = \sin(\theta) * \sin(\Phi);$ and $z_{sphere} = \cos(\theta).$ In this way, GPU 18 or CPU 16 may map a point onto a circular image, such as illustrated in FIG. 14B. GPU 18 or CPU 16 may also map a point from a circular image to a sphere, as illustrated in FIG. 14C, and also in FIGS. 3A and 3B. For instance, GPU 18 or CPU 16 may perform the example operations described above with respect to FIGS. 14A-14C for converting adjusted two-dimensional coordinates to three-dimensional coordinates, or for converting two-dimensional coordinates of non-overlapping portions to three-dimensional coordinates, as described above with respect to FIG. 9.

Figure 15:
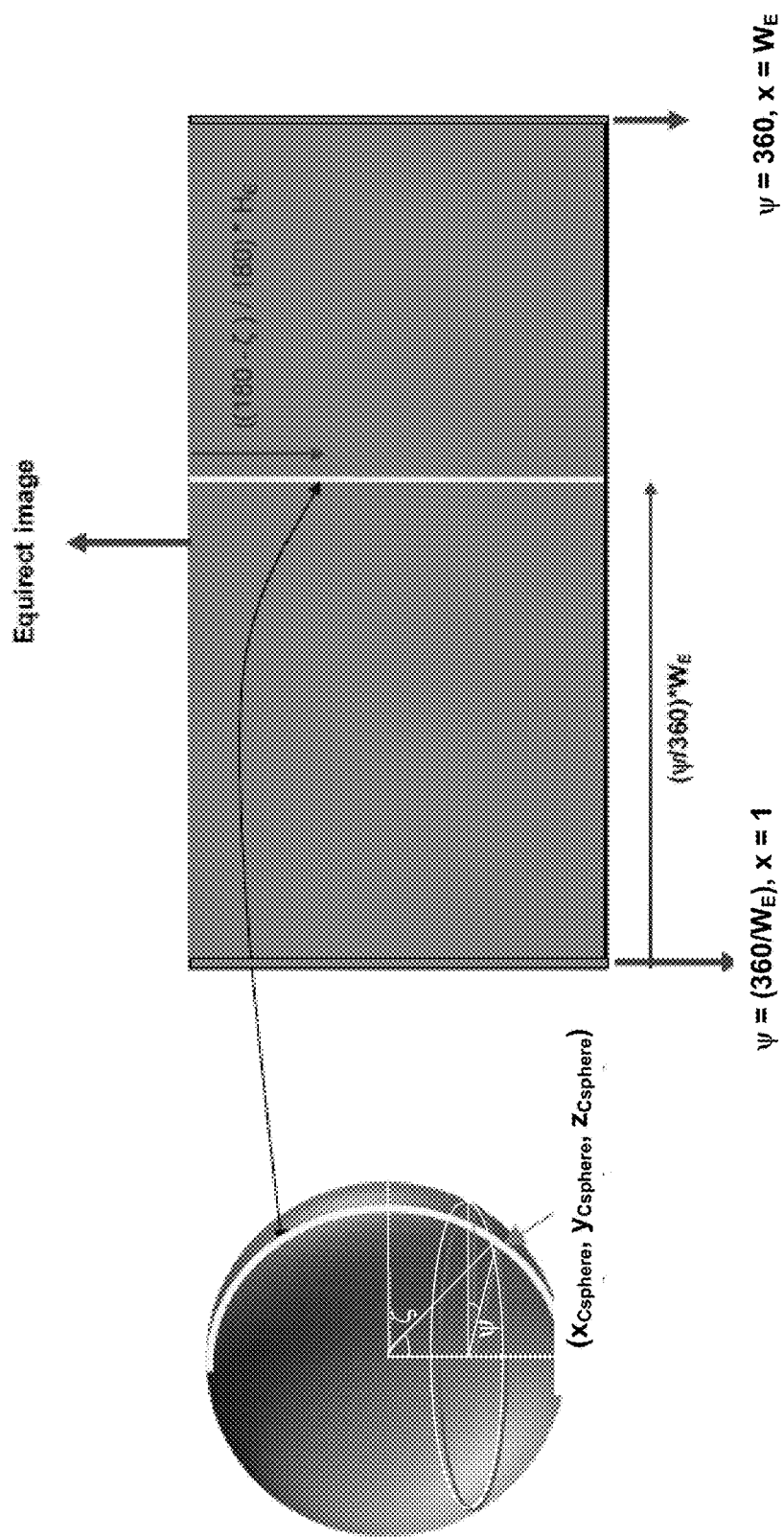
FIG. 15 is a conceptual diagram illustrating mapping of a point on a sphere to a point on an equirectangular image.

FIG. 15 is a conceptual diagram illustrating mapping of point on a sphere to a point on an equirectangular image. As described above, with respect to FIG. 9, CPU 16 and/or GPU 18 may determine mapping of coordinates to rectangular mesh based on three-dimensional coordinates of the non-overlapping portion 38, three-dimensional coordinates of the pixels in the set of overlapping bands, and information indicative of deviation from common reference.

One example way in which CPU 16 and/or GPU 18 may perform these operations is with matrix multiplication to generate three-dimensional coordinates based on the information indicative of the deviation. CPU 16 and/or GPU 18 may then map the resulting coordinates to an equirectangular mesh.

For example, CPU 16 and/or GPU 18 may receive thetax, thetay, and thetaz values, which are pose correction angles obtained from one or more IMUs 33. These can be permutations of roll, pitch, and yaw. Each of thetax, thetay, and thetaz defines a rotation matrix. CPU 16 and/or GPU 18 may multiply the rotation matrices with the original (x, y, z) coordinates to obtain the corrected coordinates. The original (x, y, z) coordinates may be $x_{sphere}, y_{sphere},$ and $z_{sphere}$ determined from the equations described above with respect to FIGS. 14A-14C.

The rotation matrices may be defined as follows:

$Rz$=[cos(theta$z$)−sin(theta$z$)0; sin(theta$z$)cos(theta$z$)0;0 0 1];

$Ry$=[cos(theta$y$)0 sin(theta$y$);0 1 0;−sin(theta$y$)0 cos(theta$y$)];

$Rx$=[1 0 0;0 cos(theta$x$)−sin(theta$x$);0 sin(theta$x$)cos(theta$x$)]; and $R=Rz*Ry*Rx.$ Based on the R matrix, CPU 16 and/or GPU 18 may determine corrected coordinates as follows: [$x_{Csphere}$, $y_{Csphere}$, $z_{Csphere}$]=$R*$[$x_{sphere}$, $y_{sphere}$, $z_{sphere}$], where [$x_{Csphere}$, $y_{Csphere}$, $z_{Csphere}$] are the coordinates after correcting for the movement indicated by IMUs 33, and [$x_{sphere}$, $y_{sphere}$, $z_{sphere}$] are coordinates on the sphere of points in circular images (e.g., FIGS. 2A and 2B) as determined based on the examples described with respect to FIGS. 14A-14C.

FIG. 15 illustrates an example of where [$x_{Csphere}$, $y_{Csphere}$, $z_{Csphere}$] are located, and mapping that point to an equirectangular image. The equirectangular image is defined by coordinates (ψ and ζ), which are polar coordinates that map to x, y coordinates. For example, $x_{equirect}$ (x-coordinate on the equirectangular image) is equal to $(\psi/360)*W_E$, where $W_E$ is the width of the equirectangular image, and $y_{equirect}$ (y-coordinate on the equirectangular image) is equal to $((180-\zeta)/180)*H_E$, where $H_E$ is the height of the equirectangular image.

The variable ζ is equal to $\cos^{-1}(y_{Csphere})$. The variable ψ can be calculated from either $x_{Csphere}$ or $z_{Csphere}$. For example, $x_{Csphere}=\sin(\zeta)\sin(\psi),$ and $z_{Csphere}=\sin(\zeta)\cos(\psi).$ In this way, as described above with respect to reference numeral 78 in FIG. 9, CPU 16 and/or GPU 18 may determine the coordinates on the mesh for texture mapping that address the rotation or wobble, as measured by IMUs 33.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of generating image content, the method comprising:
    receiving image content for a first set of bands of a first overlapping portion of a first image, and a second set of bands of a second overlapping portion of a second image, wherein the first overlapping portion and the second overlapping portion include overlapping image content, and wherein the first image includes a first non-overlapping portion;
    adjusting image content within the first set of bands until the image content within the first set of bands overlaps with image content within the second set of bands to generate a set of overlapping bands;
    receiving information indicative of deviation from a common reference;
    determining coordinates for where image content within the set of overlapping bands and the first non-overlapping portion is to be mapped on a rectangular mesh based on the deviation from the common reference to compensate for at least one of device movement or rolling shutter delay during capture of the image content; and
    generating an equirectangular image based at least in part on the determined coordinates, the set of overlapping bands, and the first non-overlapping portion.

2. The method of claim 1, wherein the rectangular mesh comprises a first rectangular mesh, and wherein the equirectangular image comprises a first equirectangular image, the method further comprising:
    determining coordinates for where image content within a second non-overlapping portion of the second image is to be mapped on a second rectangular mesh based on the deviation from the common reference; and
    generating a second equirectangular image based on the determined coordinates for where image content within the second non-overlapping portion is to be mapped on the second rectangular mesh.

3. The method of claim 1, wherein the deviation from the common reference is based at least in part on per-line rolling shutter delay of camera sensors used for capturing image content of the first and second images.

4. The method of claim 1, wherein the deviation from the common reference is based at least in part on per-line rolling shutter delay of camera sensors used for capturing image content of the first and second images and movement of the camera sensors.

5. The method of claim 1, further comprising:
    determining that holes would be created in the equirectangular images based on an initial determination of the positions of coordinates; and
    clamping vertical or horizontal locations of vertices corresponding to the coordinates based on the determination that holes would be created,
    wherein determining coordinates comprises determining the coordinates based on the clamped vertical or horizontal locations.

6. The method of claim 5, wherein determining that holes would be created comprises determining that holes would be created based on vertical or horizontal locations of the primitives or based on cross-products between edges of adjacent primitives.

7. The method of claim 1, further comprising:
    determining that holes would be created in the equirectangular images based on an initial determination of the positions of coordinates; and
    redefining vertices corresponding to the coordinates based on the determination that holes would be created,
    wherein determining coordinates comprises determining the coordinates based on the redefined vertices.

8. The method of claim 7, wherein determining that holes would be created comprises determining that holes would be created based on vertical or horizontal locations of the primitives or based on cross-products between edges of adjacent primitives.

9. The method of claim 1, further comprising:
    determining three-dimensional coordinates for image content within the set of overlapping bands based on two-dimensional coordinates of image content within the set of overlapping bands; and
    receiving three-dimensional coordinates for image content within the first non-overlapping portion,
    wherein determining coordinates comprises determining coordinates for where image content within the set of overlapping bands and the first non-overlapping portion is to be mapped on a rectangular mesh based on the received information indicative of the deviation from the common reference, the determined three-dimensional coordinates for image content within the set of overlapping bands, and the received three-dimensional coordinates for image content within the first non-overlapping portion.

10. The method of claim 1,
    wherein the first overlapping portion comprises a circular portion along the circumference of the first image having a same center point as the first image,
    wherein the first set of bands comprise a set of lines, each line including image content from a first side of the circular portion along the circumference of the first image, and a second side of the circular portion along the circumference of the first image,
    wherein the second overlapping portion comprises a circular portion along the circumference of the second image having a same center point as the second image, and
    wherein the second set of bands comprise a set of lines, each line including image content from a first side of the circular portion along the circumference of the second image, and a second side of the circular portion along the circumference of the first image.

11. A device for generating image content, the device comprising:
a memory configured to store a first image and a second image; and
one or more processing circuits configured to:
receive image content for a first set of bands of a first overlapping portion of the first image, and a second set of bands of a second overlapping portion of the second image, wherein the first overlapping portion and the second overlapping portion include overlapping image content, and wherein the first image includes a first non-overlapping portion;
adjust image content within the first set of bands until the image content within the first set of bands overlaps with image content within the second set of bands to generate a set of overlapping bands;
receive information indicative of deviation from a common reference;
determine coordinates for where image content within the set of overlapping bands and the first non-overlapping portion is to be mapped on a rectangular mesh based on the deviation from the common reference to compensate for at least one of device movement or rolling shutter delay during capture of the image content; and
generate an equirectangular image based at least in part on the determined coordinates, the set of overlapping bands, and the first non-overlapping portion.

12. The device of claim 11, wherein the rectangular mesh comprises a first rectangular mesh, and wherein the equirectangular image comprises a first equirectangular image, wherein the one or more processing circuits are configured to:
determine coordinates for where image content within a second non-overlapping portion of the second image is to be mapped on a second rectangular mesh based on the deviation from the common reference; and
generate a second equirectangular image based on the determined coordinates for where image content within the second non-overlapping portion is to be mapped on the second rectangular mesh.

13. The device of claim 11, wherein the deviation from the common reference is based at least in part on per-line rolling shutter delay of camera sensors used for capturing image content of the first and second images.

14. The device of claim 11, wherein the deviation from the common reference is based at least in part on per-line rolling shutter delay of camera sensors used for capturing image content of the first and second images and movement of the camera sensors.

15. The device of claim 11, wherein the one or more processing circuits are configured to:
determine that holes would be created in the equirectangular images based on an initial determination of the positions of coordinates; and
clamp vertical or horizontal locations of vertices corresponding to the coordinates based on the determination that holes would be created,
wherein to determine coordinates, the one or more processing circuits are configured to determine the coordinates based on the clamped vertical or horizontal locations.

16. The device of claim 15, wherein to determine that holes would be created, the one or more processing circuits are configured to determine that holes would be created based on vertical or horizontal locations of the primitives or based on cross-products between edges of adjacent primitives.

17. The device of claim 11, wherein the one or more processing circuits are configured to:
determine that holes would be created in the equirectangular images based on an initial determination of the positions of coordinates; and
redefine vertices corresponding to the coordinates based on the determination that holes would be created,
wherein to determine coordinates, the one or more processing circuits are configured to determine the coordinates based on the redefined vertices.

18. The device of claim 17, wherein to determine that holes would be created, the one or more processing circuits are configured to determine that holes would be created based on vertical or horizontal locations of the primitives or based on cross-products between edges of adjacent primitives.

19. The device of claim 11, wherein the one or more processing circuits are configured to:
determine three-dimensional coordinates for image content within the set of overlapping bands based on two-dimensional coordinates of image content within the set of overlapping bands; and
receive three-dimensional coordinates for image content within the first non-overlapping portion,
wherein to determine coordinates, the one or more processing circuits are configured to determine coordinates for where image content within the set of overlapping bands and the first non-overlapping portion is to be mapped on a rectangular mesh based on the received information indicative of the deviation from the common reference, the determined three-dimensional coordinates for image content within the set of overlapping bands, and the received three-dimensional coordinates for image content within the first non-overlapping portion.

20. The device of claim 11,
wherein the first overlapping portion comprises a circular portion along the circumference of the first image having a same center point as the first image,
wherein the first set of bands comprise a set of lines, each line including image content from a first side of the circular portion along the circumference of the first image, and a second side of the circular portion along the circumference of the first image,
wherein the second overlapping portion comprises a circular portion along the circumference of the second image having a same center point as the second image, and
wherein the second set of bands comprise a set of lines, each line including image content from a first side of the circular portion along the circumference of the second image, and a second side of the circular portion along the circumference of the first image.

21. A computer-readable storage medium storing instructions that when executed cause one or more processors of a device for generating image content to:
receive image content for a first set of bands of a first overlapping portion of a first image, and a second set of bands of a second overlapping portion of a second image, wherein the first overlapping portion and the second overlapping portion include overlapping image content, and wherein the first image includes a first non-overlapping portion;

adjust image content within the first set of bands until the image content within the first set of bands overlaps with image content within the second set of bands to generate a set of overlapping bands;

receive information indicative of deviation from a common reference;

determine coordinates for where image content within the set of overlapping bands and the first non-overlapping portion is to be mapped on a rectangular mesh based on the deviation from the common reference to compensate for at least one of device movement or rolling shutter delay during capture of the image content; and generate an equirectangular image based at least in part on the determined coordinates, the set of overlapping bands, and the first non-overlapping portion.

22. The computer-readable storage medium of claim 21, wherein the rectangular mesh comprises a first rectangular mesh, and wherein the equirectangular image comprises a first equirectangular image, the instructions further comprising instructions that cause the one or more processors to:

determine coordinates for where image content within a second non-overlapping portion of the second image is to be mapped on a second rectangular mesh based on the deviation from the common reference; and generate a second equirectangular image based on the determined coordinates for where image content within the second non-overlapping portion is to be mapped on the second rectangular mesh.

23. The computer-readable storage medium of claim 21, further comprising instructions that cause the one or more processors to:

determine that holes would be created in the equirectangular images based on an initial determination of the positions of coordinates; and clamp vertical or horizontal locations of vertices corresponding to the coordinates based on the determination that holes would be created, wherein the instructions that cause the one or more processors to determine coordinates comprise instructions that cause the one or more processors to determine the coordinates based on the clamped vertical or horizontal locations.

24. The computer-readable storage medium of claim 21, further comprising instructions that cause the one or more processors to:

determine that holes would be created in the equirectangular images based on an initial determination of the positions of coordinates; and redefine vertices corresponding to the coordinates based on the determination that holes would be created, wherein the instructions that cause the one or more processors to determine coordinates comprise instructions that cause the one or more processors to determine the coordinates based on the redefined vertices.

25. A device for generating image content, the device comprising:

means for receiving image content for a first set of bands of a first overlapping portion of a first image, and a second set of bands of a second overlapping portion of a second image, wherein the first overlapping portion and the second overlapping portion include overlapping image content, and wherein the first image includes a first non-overlapping portion;

means for adjusting image content within the first set of bands until the image content within the first set of bands overlaps with image content within the second set of bands to generate a set of overlapping bands;

means for receiving information indicative of deviation from a common reference;

means for determining coordinates for where image content within the set of overlapping bands and the first non-overlapping portion is to be mapped on a rectangular mesh based on the deviation from the common reference to compensate for at least one of device movement or rolling shutter delay during capture of the image content; and means for generating an equirectangular image based at least in part on the determined coordinates, the set of overlapping bands, and the first non-overlapping portion.

26. The device of claim 25, wherein the rectangular mesh comprises a first rectangular mesh, and wherein the equirectangular image comprises a first equirectangular image, the device further comprising:

means for determining coordinates for where image content within a second non-overlapping portion of the second image is to be mapped on a second rectangular mesh based on the deviation from the common reference; and means for generating a second equirectangular image based on the determined coordinates for where image content within the second non-overlapping portion is to be mapped on the second rectangular mesh.

27. The device of claim 25, further comprising:

means for determining that holes would be created in the equirectangular images based on an initial determination of the positions of coordinates; and means for clamping vertical or horizontal locations of vertices corresponding to the coordinates based on the determination that holes would be created, wherein the means for determining coordinates comprises means for determining the coordinates based on the clamped vertical or horizontal locations.

28. The device of claim 25, further comprising:

means for determining that holes would be created in the equirectangular images based on an initial determination of the positions of coordinates; and means for redefining vertices corresponding to the coordinates based on the determination that holes would be created, wherein the means for determining coordinates comprises means for determining the coordinates based on the redefined vertices.

* * * * *